United States Patent
Symes et al.

(10) Patent No.: US 12,355,994 B2
(45) Date of Patent: Jul. 8, 2025

(54) BIT PLANE ENCODING OF DATA ARRAYS

(71) Applicant: ARM LIMITED, Cambridge (GB)

(72) Inventors: Dominic Hugo Symes, Cambridge (GB); Sven Ola Johannes Hugosson, Lund (SE)

(73) Assignee: Arm Limited, Cambridge (GB)

( * ) Notice: Subject to any disclaimer, the term of this patent is extended or adjusted under 35 U.S.C. 154(b) by 111 days.

(21) Appl. No.: 17/296,432

(22) PCT Filed: Dec. 3, 2019

(86) PCT No.: PCT/GB2019/053416
§ 371 (c)(1),
(2) Date: May 24, 2021

(87) PCT Pub. No.: WO2020/115471
PCT Pub. Date: Jun. 11, 2020

(65) Prior Publication Data
US 2022/0014767 A1    Jan. 13, 2022

(30) Foreign Application Priority Data
Dec. 3, 2018 (GB) .................................... 1819715

(51) Int. Cl.
*H04N 19/34* (2014.01)
*H04N 19/176* (2014.01)

(52) U.S. Cl.
CPC ........... *H04N 19/34* (2014.11); *H04N 19/176* (2014.11)

(58) Field of Classification Search
CPC ...... H04N 19/176; H04N 19/61; H04N 19/13; H04N 19/70; H04N 19/46; H04N 19/18;
(Continued)

(56) References Cited

U.S. PATENT DOCUMENTS 6,614,939 B1    9/2003  Yamauchi
7,020,342 B1 *  3/2006  Kleihorst ............... H04N 19/18
                                              382/250
(Continued)

FOREIGN PATENT DOCUMENTS

CN        1684371 A     10/2005
CN      101975558 A      2/2011
(Continued)

OTHER PUBLICATIONS

GB Combined Search and Examination Report dated May 16, 2019, GB Patent Application No. GB1819715.2.
(Continued)

*Primary Examiner* — Farhan Mahmud
(74) *Attorney, Agent, or Firm* — Pearl Cohen Zedek Latzer Baratz LLP

(57) ABSTRACT

Disclosed herein is a method of encoding an array of data elements comprising transforming the array from the spatial to the frequency domain, representing the frequency domain coefficients as a plurality of bit plane arrays, and encoding the set of frequency domain coefficients as a data packet having a fixed size by encoding the bit plane arrays in a bit plane sequence working from the bit plane array representing the most significant bit downwards until the data packet is full. Each bit plane array is encoded by recursively subdividing the bit plane array into respective sections and subsections down to the individual coefficients and including in the data packet, so long as there is available space, data indicating the locations of any (sub)sections in that bit plane array that for the first time in the bit plane sequence contain one or more coefficient(s) having a non-zero bit value.

16 Claims, 15 Drawing Sheets

(58) Field of Classification Search
CPC .... H04N 19/593; H04N 19/129; H04N 19/63; H04N 19/60; H04N 19/44; H04N 19/136; H04N 19/42
See application file for complete search history.

(56) References Cited

U.S. PATENT DOCUMENTS

| | | |
|---|---|---|
| 2005/0231396 A1 | 10/2005 | Dunn |
| 2007/0071331 A1* | 3/2007 | Liu ........................ H04N 19/63 375/E7.056 |
| 2014/0092986 A1 | 4/2014 | Chou et al. |

FOREIGN PATENT DOCUMENTS

| | | |
|---|---|---|
| CN | 103119646 A | 5/2013 |
| KR | 10-2007-0023695 | 2/2007 |
| WO | 01/17268 | 3/2001 |
| WO | 01/17268 A1 | 3/2001 |

OTHER PUBLICATIONS

PCT International Search Report dated Jan. 28, 2020, PCT Patent Application No. PCT/US2019/053416.
PCT Written Opinion of the International Searching Authority dated Jan. 28, 2020, PCT Patent Application No. PCT/US2019/053416.
Office Action dated Apr. 26, 2024, Korean Patent Application No. 10-2021-7020020, 16 pages.
Office Action dated Dec. 15, 2023, Chinese Patent Application No. 201980078113.4, 23 pages.

* cited by examiner

FIGURE 3A

| 3 | 0 | 0 | 1 |
|---|---|---|---|
| 2 | 0 | 0 | 0 |
| -1 | 0 | 0 | -5 |
| 13 | +1 | 1 | 0 |

FIGURE 3B

Bit 0:
| 1 | 0 | 0 | 1 |
|---|---|---|---|
| 0 | 0 | 0 | 0 |
| 1 | 0 | 0 | 1 |
| 1 | 1 | 1 | 0 |

Bit 1:
| 1 | 0 | 0 | 0 |
|---|---|---|---|
| 1 | 0 | 0 | 0 |
| 0 | 0 | 0 | 0 |
| 0 | 0 | 0 | 0 |

Bit 2:
| 0 | 0 | 0 | 0 |
|---|---|---|---|
| 0 | 0 | 0 | 0 |
| 0 | 0 | 0 | 1 |
| 1 | 0 | 0 | 0 |

Bit 3:
| 0 | 0 | 0 | 0 |
|---|---|---|---|
| 0 | 0 | 0 | 0 |
| 0 | 0 | 0 | 0 |
| 1 | 0 | 0 | 0 |

Bit 4:
| 0 | 0 | 0 | 0 |
|---|---|---|---|
| 0 | 0 | 0 | 0 |
| 0 | 0 | 0 | 0 |
| 0 | 0 | 0 | 0 |

Bit 5:
| 0 | 0 | 0 | 0 |
|---|---|---|---|
| 0 | 0 | 0 | 0 |
| 0 | 0 | 0 | 0 |
| 0 | 0 | 0 | 0 |

FIGURE 6

Bit 3

| 0 | 0 | 0 | 0 |
|---|---|---|---|
| 0 | 0 | 0 | 0 |
| 0 | 0 | 0 | 0 |
| 1 | 0 | 0 | 0 |

Codes

Step 501: '0' — First 2x2 block of 4 is active

Step 502: '0' — First coeff in first block is active | '0' — Sign of newly activated coeff Step 503: ' ' — No refinement bits

Bit 2

| 0 | 0 | 0 | 0 |
|---|---|---|---|
| 0 | 0 | 0 | 0 |
| 0 | 0 | 0 | 1 |
| 1 | 0 | 0 | 0 |

Codes

Step 501: '1100' — Second 2x2 block of 3 is active [First 2x2 is already active]

Step 502: '0' — No new coeffs in first block | '111000' — Fourth coeff active in second block | '1' — Sign of new coeff (-ve)

Step 503: '1' — refinement bit for first coeff

Bit 1

| 1 | 0 | 0 | 0 |
|---|---|---|---|
| 1 | 0 | 0 | 0 |
| 0 | 0 | 0 | 0 |
| 0 | 0 | 0 | 0 |

Codes

Step 501: '10' — First 2x2 block of 2 is active

Step 502: '0' — No new active coeff in first block | '101' — First two coeffs active in second block | '00' — Signs of two new active coeffs in second block | '0' — No new active coeffs in third block Step 503: '00' — Refinement bits for two already active coeffs

Bit 0

| 1 | 0 | 0 | 1 |
|---|---|---|---|
| 0 | 0 | 0 | 0 |
| 1 | 0 | 0 | 1 |
| 1 | 1 | 1 | 0 |

Codes

Step 501: '1' — Remaining block now active

Step 502: '1101' — Two new active coeffs in first block | '10' — Signs of two new active coeffs | '00' — No new coeffs in second block | '10' — One new active coeff in third block | '0' — Sign | '111000' — Fourth coeff active in third block Step 503: '1011' — Refinement bits for four already active coeffs

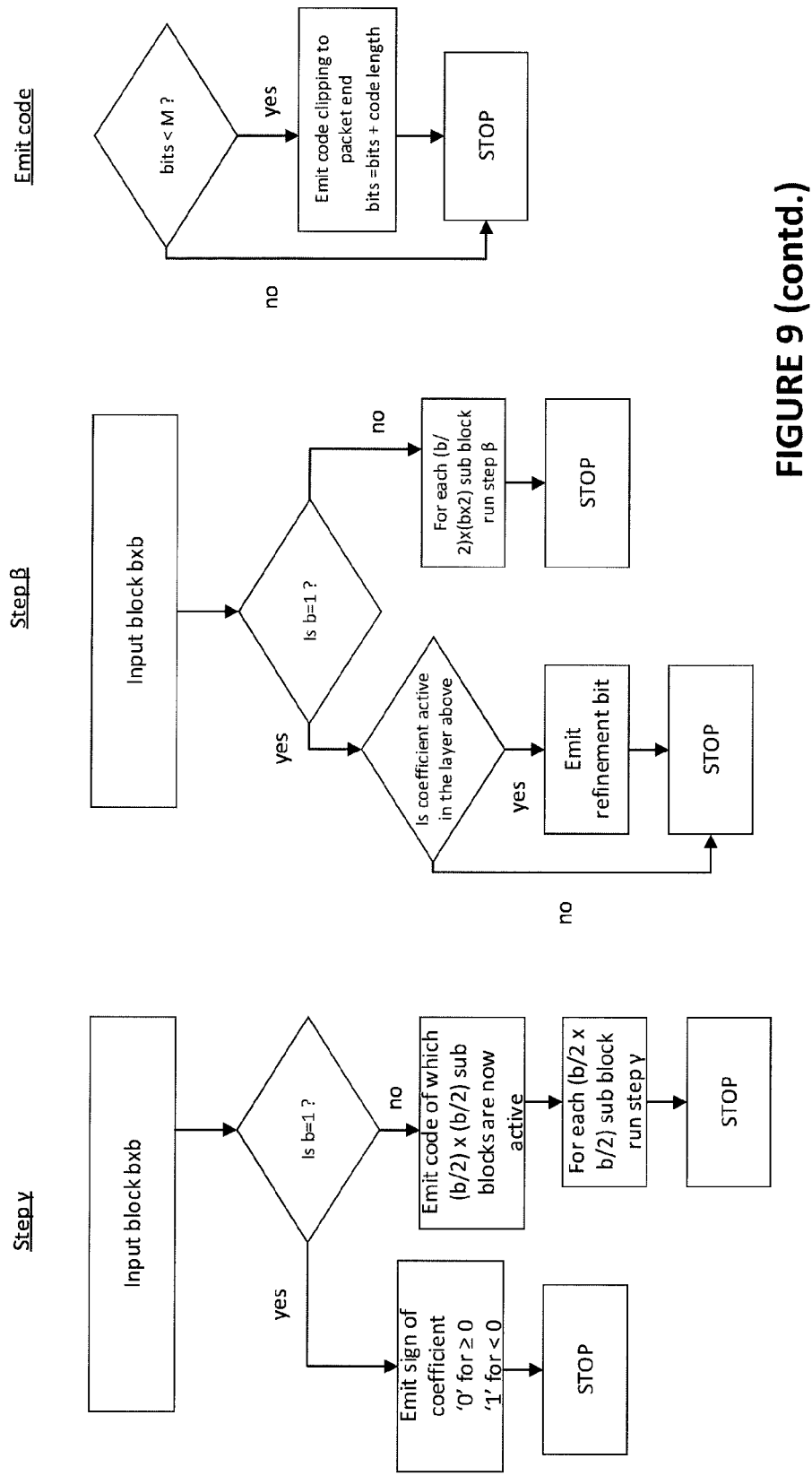
FIGURE 9 (contd.)

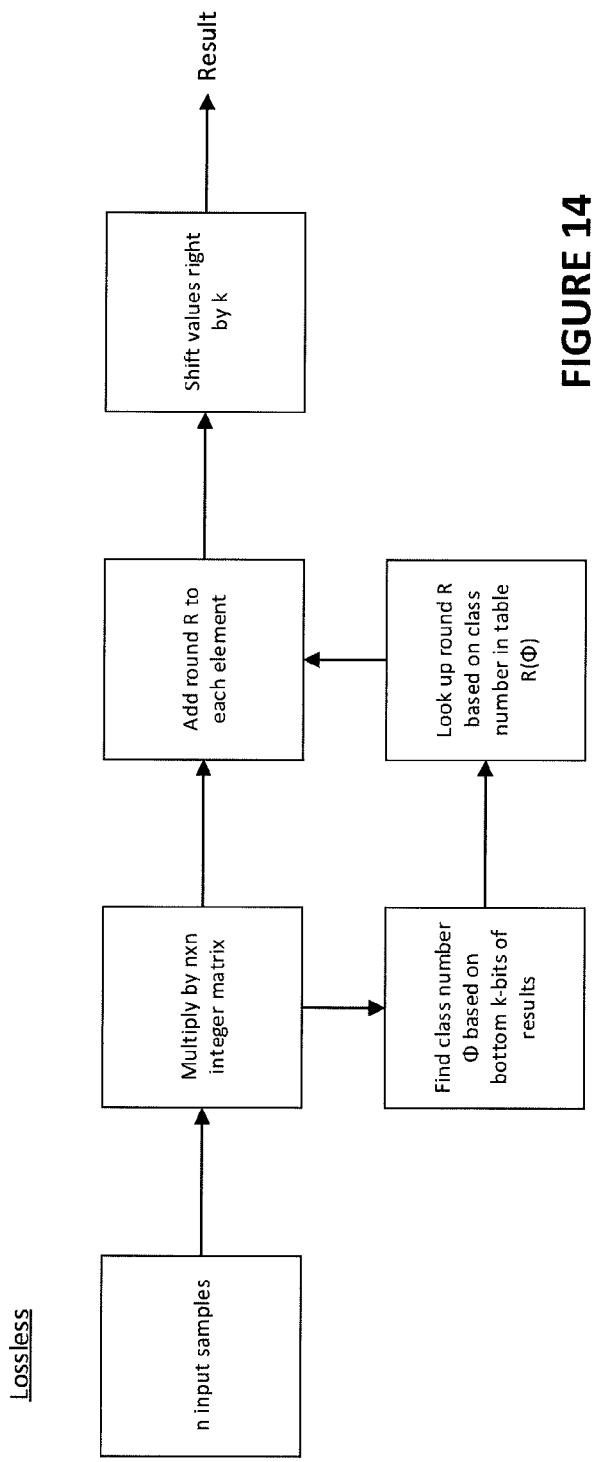

BIT PLANE ENCODING OF DATA ARRAYS

BACKGROUND

The technology described herein relates to a method of and apparatus for encoding data, e.g. for storage in memory, in data processing systems, and in particular to methods for compressing and storing image data such as texture or frame buffer data in graphics processing systems. Also described are a corresponding decoding method and apparatus.

Data processing systems often store generated image data within a frame buffer. The frame buffer typically contains a complete set of data for a frame (image), e.g. that is to be displayed, including, for example, colour values for each of the (e.g.) pixels within that frame. A suitable display driver is then able to read the contents of the frame buffer and use the image data stored therein to drive a display to display the desired frame (image).

However, the storage and access of the image data in the frame buffer (the 'frame buffer data') can place relatively high demands on the, e.g., storage and/or bandwidth resource of the data processing system (or conversely lead to a reduced performance when such demands are not met). To reduce the burden imposed on the data processing system, it is therefore desirable to be able to store such frame buffer data in a "compressed" format. This is particularly desirable in data processing apparatus, e.g. of portable devices such as digital cameras, or mobile devices including such cameras, where processing resources and power may be relatively limited.

Similar considerations apply to various other instances where it is desired to reduce the amount of data needed for the storage and/or transmission of a certain piece of information. Another example, also in the context of graphics processing, would be when storing texture data, e.g. in the form of an array of texture elements (or 'texels') each representing given texture data (such as colour, luminance, etc.) that can then be mapped onto respective sampling positions (pixels) of a render output being generated. Again, the storage and access of this texture data can place relatively high storage and/or bandwidth requirements on the data processing system.

Accordingly, it is common to encode arrays of data elements, such as arrays of image data values, so as to compress the data in order to reduce bandwidth and memory consumption. To this end, various data compression schemes have been developed.

The Applicants believe, however, that there still remains scope for more efficient arrangements for encoding (compressing) data.

BRIEF DESCRIPTION OF THE DRAWINGS

Various embodiments of the technology described herein will now be described by way of example only and with reference to the accompanying drawings, in which:

FIG. 3A shows an example of a typical 4×4 block of data values, e.g. as may be obtained after a frequency domain transform, for encoding according to embodiments of the technology described herein, and FIG. 3B shows how this block of data values can be decomposed into a set of binary bit planes;

FIG. 6 shows an example of the encoding according to embodiments of the technology described herein for the bit plane represented data values shown in FIG. 3B;

FIG. 14 shows schematically an example of how a lossless transform may be achieved for use with embodiments of the technology described herein.

Figure 1:
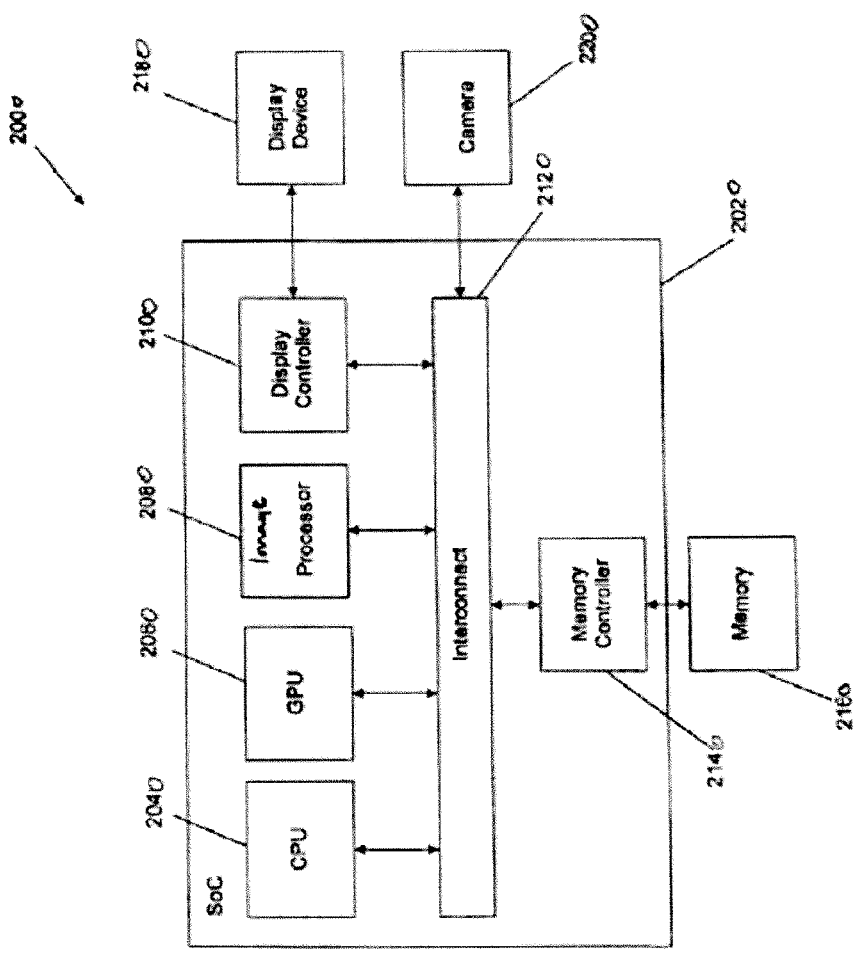
FIG. 1 shows schematically an example of a data processing system within which embodiments of the technology described herein may be implemented.

The drawings show elements of data processing apparatuses and systems that are relevant to embodiments of the technology described herein. As will be appreciated by those skilled in the art there may be other elements of the data processing apparatus and system that are not illustrated in the drawings. It should also be noted here that the drawings are only schematic, and that, for example, in practice the shown elements may share significant hardware circuits, even though they are shown schematically as separate elements in the drawings (or, conversely, where elements are shown as sharing significant hardware circuits, these may in practice comprise separate elements).

DETAILED DESCRIPTION

A first embodiment of the technology described herein comprises a method of encoding an array of data elements representing a spatial distribution of values, the method comprising:

performing a frequency transform operation on the array of data elements to generate a corresponding set of frequency domain coefficients;

representing the set of frequency domain coefficients as a plurality of bit plane arrays, each bit plane array representing a particular bit position of the frequency domain coefficient values, wherein each bit plane array comprises an array of bits corresponding to the bit values of each of the frequency domain coefficients at the bit position that the bit plane array represents; and encoding the set of frequency domain coefficients as a data packet having a fixed size by encoding the bit plane arrays in a bit plane sequence working from the bit plane array representing the most significant bit downwards until the data packet is full, wherein each bit plane array is encoded by subdividing the bit plane array into respective sections and, subject to there being available space in the data packet, including in the data packet data indicating the locations of any sections in that bit plane array that for the first time in the bit plane sequence contain one or more coefficient(s) having a non-zero bit value, and then recursively subdividing into respective subsections any such newly active sections in the bit plane array as well as any sections for which the first non-zero bit value appeared in a previous bit plane array in the bit plane sequence, and including in the data packet data indicating the locations of any subsections for which the first non-zero bit value in the bit plane sequence appears in the bit plane array until the location(s) of the coefficient(s) for which the first non-zero bit value appears in the bit plane array are indicated.

A second embodiment of the technology described herein comprises an apparatus for encoding an array of data elements representing a spatial distribution of values, the apparatus comprising an encoder comprising:

transforming circuitry for performing a frequency transform operation on the array of data elements to generate a corresponding set of frequency domain coefficients;

bit plane coding circuitry for representing the set of frequency domain coefficients as a plurality of bit plane arrays, each bit plane array representing a particular bit position of the frequency domain coefficient values, wherein each bit plane array comprises an array of bits corresponding to the bit values of each of the frequency domain coefficients at the bit position that the bit plane array represents; and encoding circuitry that is configured to encode a set of bit plane array represented frequency domain coefficients as a data packet having a fixed size by encoding the bit plane arrays in a bit plane sequence working from bit plane array representing the most significant bit downwards until the data packet is full, wherein the encoding circuitry is configured to encode each bit plane array by subdividing the bit plane array into respective sections and, subject to there being available space in the data packet, including in the data packet data indicating the locations of any sections in that bit plane array that for the first time in the bit plane sequence contain one or more coefficient(s) having a non-zero bit value, and then recursively subdividing into respective subsections any such newly active sections in the bit plane array as well as any sections for which the first non-zero bit value appeared in a previous bit plane array in the bit plane sequence, and including in the data packet data indicating the locations of any subsections for which the first non-zero bit value in the bit plane sequence appears in the bit plane array until the location(s) of the coefficient(s) for which the first non-zero bit value appears in the bit plane array are indicated.

In the technology described herein, when encoding an array of data elements, such as a block of image data, or the like, a frequency transform operation is first applied to the array of data elements to transform the spatial representation of the data array into the frequency domain. The frequency domain coefficients can be (and in an embodiment are) stored using a sign-magnitude format, i.e. wherein a single bit is used for indicating the sign value (e.g. "1" for positive and "0" for negative, or vice versa), and wherein the magnitude is the absolute value of the coefficient (and so the most significant bit is also the highest non-zero bit). Bit plane coding is then performed on the frequency domain coefficients to decompose the (absolute) magnitude values for the frequency domain coefficients into a set of bit plane arrays containing the respective (binary) bit values at each bit position for each of the frequency domain coefficients. The bit plane represented data is then encoded by packing the bits from the most significant (top) bit plane downwards into a fixed size data packet until the data packet is full.

Thus, the encoding is stopped when the data packet is full. In this way, it can be ensured that a data packet having a desired fixed size can be generated.

The technology described herein is thus capable of providing fixed rate compression (a fixed bit rate) wherein an array of data elements, such as a block of image data, or the like, can be encoded (compressed) into a fixed size data packet.

Naturally, because the technology described herein codes to a fixed bit rate, the compression into the fixed size data packet is inherently 'lossy' (since once the fixed size data packet is full any remaining bits are not then included into the data packet). However, for many applications, it is acceptable to lose some output (image) fidelity, and it is more desirable to be able to guarantee a given bandwidth (bit rate) (which the technology described herein can provide).

(By contrast, although existing lossless compression formats may reduce the average bandwidth, the resulting data packet sizes are variable, such that lossless compression formats cannot guarantee fixed rate compression, and a memory system using lossless compression must therefore generally provide for the 'worst case' bandwidth even if the typical bandwidth is lower.)

Furthermore, in the technology described herein, the information within each bit plane array is encoded in a context-dependent manner wherein the bit plane information is encoded based on the information in previous bit planes (layers) in the bit plane sequence. In this way, the information can be encoded in a particularly efficient manner. For instance, by contrast to other lossy compression formats, such as JPEG or MPEG, which are typically looking to achieve higher compression quality, the technology described herein may provide a more efficient compression, e.g., to facilitate higher throughput. This may be particularly desirable for higher bandwidth, e.g. media, applications.

In particular, in order to encode the bit plane information, the technology described herein encodes the locations of the coefficients appearing in each bit plane recursively, by subdividing the bit plane array into respective sections (e.g. quadrants), indicating which section (quadrant) has a newly "active" frequency domain coefficient in that bit plane (i.e. a frequency domain coefficient for which its first non-zero bit value in the bit plane sequence appears in that bit plane), and then for any section that includes a newly active frequency domain coefficient in that bit plane, as well as for any sections, or subsections, indicated as being (newly) active during the encoding of a previous (higher) bit plane in the bit plane sequence, subdividing those sections into further subsections and indicating which of these subsection(s) include any newly active coefficients in that bit plane, and so on, as necessary, down to the locations of the individual frequency domain coefficients (i.e. the positions of the individual coefficients in the bit plane array) within the bit plane in question.

Also, the encoding of each successive bit plane in an embodiment encodes (indicates) the locations of the newly active sections relative to the preceding (higher) bit planes (levels) in the bit plane sequence, such that, for example, if a section has previously been indicated as including a newly active coefficient in a higher bit plane, for the next bit plane down the active "subsection" indication indicates which (if any) of the remaining (e.g. three, in the case of quadrants) "subsections" "newly" include an active coefficient (i.e. the first non-zero bit value in the bit plane sequence for a frequency domain coefficient).

Thus, when encoding a given bit plane, any "newly active" sections in that bit plane, i.e. those sections for which a non-zero bit value for at least one of the frequency domain coefficients included within that section appears for the first time in the bit plane sequence in that bit plane, are indicated. However, once a section has been made active ("activated") in this way, it in an embodiment then remains "active" during the encoding of the next (lower) bit plane in the bit plane sequence (and all subsequent bit planes in the bit plane sequence). The locations of any newly active subsections, and ultimately the locations of any newly active coefficients, within each of the currently active sections (i.e. any sections that are newly active in the current bit plane, as well as any sections that were newly active in a previous bit plane in the bit plane sequence) can then be encoded during the encoding of a particular bit plane, in an embodiment using a variable length coding scheme, e.g. as described later.

The encoding of each bit plane is thus context-dependent on the previous bit plane (layer) in the bit plane sequence (and indicates changes relative to the previous bit plane).

So long as there is still available space in the data packet, the technology described herein in an embodiment then adds further data to the data packet, e.g. indicating the sign values for the newly active coefficients in the bit plane array being encoded and/or so-called "refinement bit values" for the bit plane array. (The "refinement bit values" represent the bit values in the bit plane in question for any coefficients for which the first non-zero bit value appeared in a previous bit plane in the bit plane sequence, i.e. the bit values for the less significant bit positions following the first non-zero bit position for those coefficients. The refinement bit values for a given bit plane array are thus the bit values in that bit plane array for the coefficients that were previously "activated" in a higher bit plane in the bit plane sequence). These sign and refinement bit values are in an embodiment raw coded (included as their actual values) in the data packet for the encoding of a bit plane array.

In this way, a code can be generated that indicates the locations (and in an embodiment also the sign and refinement bit values) for the bits in a bit plane (and in each of the bit planes), at least until the fixed data packet size is reached.

The Applicants believe that the technology described herein may provide a particularly efficient fixed rate compression scheme. For example, often, particularly where the array of data elements represents image data, the bit plane representation of the frequency domain coefficients will contain a number of leading "zeros". By encoding the bit plane arrays according to the methods of the technology described herein wherein for each bit plane (layer) being encoded any newly active sections are signalled, and it is changes relative to the previously encoded bit plane(s) (layer(s)) that are then signalled, the technology described herein is able to compress this information with a higher implementation efficiency (e.g. by contrast to relatively intensive arithmetic or run length coding schemes wherein the bit planes would have to be scanned in a certain order).

The array(s) of data elements represent a spatial distribution of values. That is, the array(s) of data elements represents a set of data values that are distributed in the spatial domain. So, each data element may represent a data value at a certain position within the spatial distribution. Thus, in embodiments, the array(s) of data elements may (each) correspond to an array of data positions. In embodiments, the array(s) of data elements or positions may correspond to all or part of a desired (e.g. image) output, such as a still image or a video frame (e.g. for display). That is, the array(s) of data elements in an embodiment comprise array(s) of image data, i.e. data that may be used to generate an image for display. Thus, an array of data may in embodiments correspond to a single still image that is to be encoded. In other embodiments an array of data may correspond to a video frame of a stream of video frames that are to be encoded.

Although embodiments relate to data array(s) including image and/or video data, other examples of data array arrangements would be possible if desired and in general the array(s) of data elements may comprise any data array that can suitably or desirably be encoded according to the technology described herein.

Indeed, in any of the embodiments described herein the array(s) of data elements may take any desired and suitable form.

For instance, in general, there may be any desired and suitable correspondence between the data elements or positions and the desired output. For example, the data elements or positions of the array(s) may each correspond to a pixel or pixels of a desired output. The array(s) of data elements can be any desired and suitable size or shape in terms of data elements or positions, but are in an embodiment rectangular (including square). The data elements may also have any desired and suitable format, for example that represents image data values (e.g. colour values).

In any of the embodiments described herein, the array(s) of data elements may be provided in any desired and suitable way. Embodiments may comprise generating (at least some or all of) the data elements of the array(s). Embodiments may also or instead comprise reading in (at least some or all of) the data elements of the array(s), e.g. from memory.

The data elements of the array(s) may be generated in any desired and suitable way. In embodiments, the data elements of the arrays may be generated by a camera such as a video camera. In other embodiments, generating the data elements of the arrays may comprise a rendering process. The rendering process may comprise deriving the data values represented by the data elements of the arrays (e.g. by rasterising primitives to generate graphics fragments and/or by rendering graphics fragments). A graphics processor (a graphics processing pipeline) may be used in order to generate the data elements of the arrays. The graphics processing pipeline may contain any suitable and desired processing stages that a graphics pipeline and processor may contain, such as a vertex shader, a rasterisation stage (a rasteriser), a rendering stage (a renderer), etc., in order to generate the data elements of the arrays.

Typically, the data elements of the data array(s) may be encoded as "blocks" of data elements, e.g. on a block by block basis. For instance, the array(s) of data elements may be divided into plural source blocks to be encoded on a block by block basis (e.g. using the other blocks in the data array, or using blocks in adjacent data arrays in a sequence of data arrays). Thus, any reference herein to processing or encoding a data array or data elements of a data array should be considered to include, and typically involves, processing or encoding such blocks of data elements. A "block" may generally comprise an N×N array of data elements.

Thus, in an embodiment, when encoding an (overall) array of data elements, e.g. representing an entire frame (image), the (overall) array of data elements is divided into a plurality of blocks, and each block is then encoded according to the encoding scheme of the technology described herein to provide a corresponding set of data packets each having a fixed size. That is, each block of data elements within the larger array of data elements is in an embodiment encoded (compressed) into a fixed size data packet. Thus, in an embodiment, the data array that is being encoded into a fixed size data packet comprises a block of data elements from a larger, overall, data array (and this is in an embodiment repeated for each of the plural blocks making up the overall data array). The data packets for each of the blocks can then be suitably combined, in a certain order, into an encoded data stream representing the overall array of data elements.

Thus, the technology described herein is in an embodiment a block-based scheme, with each block in an embodiment being independently encoded, such that blocks can then be independently decoded. This may facilitate random access to blocks within frames that have been encoded using the technology described herein. For instance, it will generally be known how many bytes there are per data packet (block), and the location of individual blocks within memory can therefore easily be identified, such that they are easy to load and to random access.

The data elements may comprise difference values, e.g., compared to a reference frame or block. However, more often, the encoding scheme is used for encoding raw data, and the data elements may therefore represent (raw) pixel values.

Essentially, the technology described herein takes an appropriate array of data elements (such as an N×N block), which will have a given size in its raw form, and encodes that array (block) in a data packet of the desired size e.g. to meet the required compression rate.

The technology described herein is thus capable of compressing a given data array into a data packet having a fixed size. For instance, the technology described herein may compress to a fixed (selected) bit rate, such as to one half, or one third, of the original size. For example, a block that is 64 bytes in its raw form may be compressed, for example, to a fixed rate of 32 bytes per block (half rate compression). Similarly, a raw block having 96 bytes (which might be the case, for example, for an 8×8 YUV420 block), may be compressed to 48 bytes (half rate) or 32 bytes (one third rate).

When encoding an array of data elements, the technology described herein performs a frequency transform operation on the array of data elements to generate a corresponding set of frequency domain coefficients. The technology described herein may thus in embodiments take successive arrays (blocks) of data elements from the frame, and then subject them to a suitable transformation to the frequency domain. For instance, in embodiments, a discrete cosine transformation (DCT) may be used. However, in general any suitable spatial to frequency domain transformation may be used, as desired.

The frequency transform may be applied to the array of data elements as a whole (as a two-dimensional frequency transform), or the array of data elements may be divided into a number of sub-arrays (which may be either one dimensional, e.g. a single row, or multi-dimensional) with each sub-array being transformed separately. For example, each row of the array may be transformed separately using a one-dimensional frequency transform. Alternatively, the array may be divided into a number of smaller, e.g. 2×2, sub-arrays that are then transformed separately. However, other arrangements would of course be possible (and modifications of the transform are described further below).

It will be appreciated that the frequency transform operation may help to compress the (image) data. For example, for a given image, each data element potentially carries the same amount of information in the spatial domain, so that removing half of the bits would potentially lose half of the information from the original image. However, in the frequency domain, the lower frequency components are typically more important (carry more information) than the higher frequency components. So, it is possible to remove more of the higher frequency components without losing so much information from the original image.

The (transformed) frequency domain coefficients are then encoded using bit plane coding. That is, the raw (transformed) frequency domain coefficient values are then decomposed into a set of binary bit planes that can then be represented using a plurality of bit plane arrays, each bit plane array representing a particular bit position of the frequency domain coefficient (magnitude) values, wherein each bit plane array comprises an array of bits corresponding to the bit values of each of the frequency domain coefficients at the bit position that the bit plane array represents.

For instance, for a 6-bit data representation, there would then be six bit planes, with the most significant bits (MSBs) being included in the higher (top) bit planes, which therefore contain the roughest but most critical information, and so that moving down the bit planes towards the least significant bit plane, there is a progressively less significant contribution to the final output (image). For instance, a bit on the nth bit plane on an m-bit dataset having a value of "1" will contribute a value of $2^{(m-n)}$ to the final output (image). That is, a given bit plane can effectively contribute half of the value of the previous (higher) bit plane. In other words, working downwards through the sequence of bit planes, adding the next bit plane therefore gives a progressively better approximation of the final output (e.g. image).

The bit plane encoded representation of the frequency domain coefficients (i.e. the bit plane arrays) is then put into the data packet working in sequence from the most significant bit plane downwards until the data packet is full (until the desired fixed size has been reached). Thus, in order to generate a fixed size data packet, the technology described herein starts from the bit plane array representing the most significant bit, and works downwardly towards the least significant bit plane, encoding each bit plane in the sequence of bit planes in turn, until the data packet is full. In this way, it can be ensured that the most critical information is put into the data packet, and that (only) the less significant lower bit plane information is discarded (when the desired fixed size is reached).

So, it will be appreciated that the encoding described below is performed until the data packet is full, at which point the encoding is stopped (with any remaining bits (and bit planes) that have yet to be encoded not then included into the data packet).

As mentioned above, often, the bit plane representation of the frequency domain coefficients will contain a number of leading "zeros", such that the highest bit planes may be "empty" (i.e. the bit plane array contains an array of "zeros"). Where the highest bit planes are empty, and contain no active frequency domain coefficients (coefficients having non-zero bit values in that bit plane), this can be suitably indicated at the start of the encoding, e.g., by including a "0" at the start of the data packet for each empty bit plane in the bit plane sequence until the first bit plane that includes a non-zero bit value of a frequency domain coefficient (the first "active" bit plane) is reached, e.g. so that the data packet will include a sequence of leading zeros.

However, other suitable arrangements for indicating the first active bit plane are of course possible.

Once the first bit plane array in the bit plane sequence (working from the bit plane representing the most significant bit downwards) including one or more non-zero bit value(s) is reached, this (first) bit plane array can then be encoded according to the particular encoding scheme of the technology described herein. Each of the subsequent bit plane arrays in the bit plane sequence is then encoded in turn according to the encoding scheme of the technology described herein until the data packet is full (at which point the encoding is stopped).

In particular, in order to encode the information for each bit plane, the technology described herein uses a technique that recursively encodes the locations of the coefficients (newly) appearing in each bit plane array by subdividing the bit plane array into respective sections, indicating which section(s) has a newly active frequency domain coefficient (i.e. a frequency domain coefficient for which the first non-zero bit position is represented by that bit plane), and then for any section that includes a newly active frequency domain coefficient in that bit plane, and any sections for which the first non-zero bit value appeared in a previous (higher) bit plane in the bit plane sequence, subdividing that section into sections and indicating which sub-section includes any newly active coefficients, and so on, as necessary, down to the individual frequency domain coefficient positions within the bit plane in question.

In an embodiment, the bit plane arrays are subdivided into quadrants, e.g. using a recursive quad tree partitioning data structure. Thus, any subdivision into sections or sub-sections in embodiments comprises a subdivision into quadrants or sub-quadrants. Any references herein to a "section" can therefore be understood in embodiments to refer to a "quadrant". However, other arrangements for subdividing the bit plane arrays into "sections" would also be possible.

Thus, each bit plane array is encoded by subdividing the bit plane array into respective sections and indicating as being newly active any sections in that bit plane that for the first time in the bit plane sequence contain one or more coefficient(s) having a non-zero bit value, and then recursively subdividing each currently active section into respective subsections and indicating any subsections that are newly active in that bit plane until the location(s) of the coefficient(s) that are newly active in that bit plane are indicated.

The encoding of each bit plane thus proceeds recursively with each bit plane array being divided and subdivided over a number of different levels down to the level of the individual coefficients.

For instance, during the first (highest) level of encoding a given bit plane, the bit plane is divided into a first set of sections (quadrants) and it is determined, and indicated, whether any of these sections newly contain a non-zero bit value for at least one of the frequency domain coefficients within that section. At the next level, the encoding then further subdivides those sections into subsections and indicates which of these subsections includes any newly active coefficients, and so on, down to the level of the individual coefficients. In this way the positions of the individual coefficients that are newly active in that bit plane are indicated.

Once one (e.g. the first) bit plane array has been encoded in this way, the next bit plane array in the bit plane sequence is encoded in the same way, and so on, until the data packet is full. For the next bit plane, the first (highest) level of encoding again looks for any newly active sections. However, at the next level, the encoding now looks at not only the newly active sections in that bit plane, but also any sections that were "activated" during the encoding of the previous bit plane. For all of the currently active sections the locations of any subsections including newly active coefficients are then indicated, and so on, down to the level of the individual coefficients.

For example, for an N×N bit plane array, the array is in an embodiment first subdivided into four N/2×N/2 quadrants, and it is then indicated which (if any) of these quadrants is newly active (compared to the previous bit plane(s)). Any of the N/2×N/2 quadrants that is currently active (so, any newly active quadrants in the current data plane as well as any quadrants that were indicated as being newly active in a higher bit plane) can then be further subdivided into N/4× N/4 quadrants and an indication provided as to which of these quadrants is newly active, and so on, until the positions of the coefficients that are newly active in that bit plane are indicated. So, it will be appreciated that for a 4×4 bit plane array, there will only be two levels of subdivision for each bit plane array (an initial dividing of the bit plane array into four 2×2 quadrants, and then a dividing of these quadrants into the respective 1×1 coefficients). On the other hand, a $2^n \times 2^n$ bit plane array may generally be subdivided n times.

Each successive bit plane level thus encodes (indicates) the locations of the active quadrants relative to the preceding (higher) bit planes in the bit plane sequence, such that, for example, if a quadrant has already previously been indicated as including a newly active coefficient in the higher bit plane, for the next bit plane down in the bit plane sequence the active quadrant indication indicates which of the remaining three quadrants (if any) newly include an active coefficient (a non-zero bit value for a frequency domain coefficient). Thus, each bit plane encoding is context-dependent on the layer above (and tells you any changes relative to the layer above).

Thus, it will be appreciated that in the encoding scheme of the technology described herein, for each bit plane in the bit plane sequence, newly active sections, i.e. those which have not previously being indicated as being active during the encoding of a higher bit plane, are indicated.

In general, any suitable code can be used for indicating the locations of the newly active quadrants in a given bit plane (layer). However, it will be appreciated that because the code only needs to indicate newly active sections, along with the positions and values of any coefficients within the currently active sections, the code can advantageously be kept relatively simple. For example, the recursive encoding schemes of the technology described herein may allow relatively complex significant bit dependencies to be encoded using a relatively low cost (low complexity) variable length code table.

This all has in particular the effect of compressing the leading "zeros" in the bit plane representations of the frequency domain coefficients in an efficient manner.

As well as encoding the locations of the newly active frequency domain coefficients for a given bit plane in the above manner, so long as there is sufficient space remaining in the data packet, further data is in an embodiment included in the data packet following that "location" data for the bit plane in question, that in an embodiment also indicates sign bits indicating the sign(s) of the newly active coefficient(s) (positive or negative) for the bit plane in question. In an embodiment, as well as the sign bits for the newly active coefficient(s) for the bit plane in question, data is also included in the data packet indicating the bit values for any coefficients in that bit plane whose first non-zero bit value appeared in a higher bit plane in the sequence (the so-called "refinement bit values" for the bit plane in question, representing the bit values for any frequency domain coefficients whose first non-zero bit value appeared in a higher bit plane, and so that were "activated" previously, and whose position was therefore indicated, during the encoding of the higher bit plane. The refinement bit values are thus the bit values for the bit positions following the leading non-zero bit position of a given coefficient).

These sign and refinement bit values are in an embodiment encoded in their raw form (i.e. indicating the true values of those bits) (which for the sign bit may be an assigned value, e.g. "1" for positive and "0" for negative, or vice versa).

The sign bits are in an embodiment encoded just after (the locations of) any newly active coefficients have been encoded (indicated). That is, the respective sign bit for a newly active coefficient is in an embodiment encoded (indicated) in the data packet immediately after the data indicating the location of that coefficient.

On the other hand, the refinement bit values for a given bit plane array are in an embodiment encoded (indicated) only after all of the newly active coefficients (and in embodiments along with their respective signs) for that bit plane array have been encoded (indicated). For example, the refinement bit values for a particular bit plane may be encoded (indicated) in the data packet as the final part of the code for that bit plane, after the data indicating the locations (and in an embodiment signs) for the newly active coefficients for that bit plane. This then means that if the encoding of a bit plane is stopped because the end of the data packet is reached before that bit plane has been fully encoded, the newly significant bits for the bit plane will be preferentially encoded before the refinement bit values.

So, in an embodiment, for each bit plane (so long as there is available space in the data packet), the encoding first indicates (the locations of) any newly active sections in that bit plane, then indicates the locations, and in an embodiment, signs of any newly active coefficients within any sections (and subsections) that are currently active within that bit plane, and then finally adds the refinement bit values for any coefficients that were "activated" in a previous bit plane.

Thus, in embodiments, the encoding for each bit plane array further comprises, so long as there is available space in the data packet, including in the data packet after the data indicating the location of a newly active coefficient data indicating the sign for that newly active coefficient.

Additionally (or alternatively), in embodiments, the encoding for each bit plane array may further comprise, so long as there is available space in the data packet, including in the data packet data indicating the raw bit values for any coefficient(s) for which the first non-zero bit value appeared in a previous bit plane array in the bit plane sequence. This data indicating the bit values for any coefficient(s) for which the first non-zero bit value appeared in a previous bit plane array in the bit plane sequence is in an embodiment included in the data packet after the position(s) of all of the newly active coefficient(s) in that bit plane have been indicated.

Where the data being encoded contains multiple data channels (e.g. YUV or RGB data), each channel is in an embodiment encoded separately, and the encoding is in an embodiment so as to first encode the locations of the newly active coefficients for each data channel (colour plane) one after another (in an interleaved manner) before then encoding the refinement bit values for each data channel within a bit plane. This then means that if the bit plane encoding is stopped because the end of the data packet is reached, the newly significant bits for each colour channel will be preferentially encoded before the refinement bit values.

The Applicants have also recognised that this encoding arrangement may not be so appropriate for particular forms of input data. For example, as discussed above, this encoding technique may be particularly appropriate for efficiently encoding image data that has been transformed into the frequency domain, and wherein there is expected to be a leading sequence of "0"s. However, for other forms of input data, such as random input data, the techniques may be less efficient.

In this case, the encoder can in embodiments recognise instances when using the particular encoding scheme described according to the technology described herein may be less suitable, and in that case in an embodiment encode the input data in a different way, e.g. in a raw format (without encoding the input data by performing a frequency transform and bit plane coding), and indicate to the decoder that that is what has been done. Thus, the encoder may be able to select between a plurality of different available encoding schemes based on the input data. The encoder may select an encoding scheme based on the input data in various suitable ways, e.g. based on a suitable metric. For example, in embodiments, the encoder may perform a frequency transform operation on the array of data elements, e.g. as described herein, and then select an encoding scheme based on a suitable metric such as a sum of the absolute values of the transformed coefficients, or similar.

That is, the encoder may perform a frequency transform operation and then analyse the frequency transformed efficients to check whether the encoding scheme described according to the technology described herein is suitable (is likely to provide an improvement). When the sum of the absolute values of the transformed coefficients indicates that the encoding scheme described according to the technology described herein is advantageous (e.g. the sum is smaller than the sum of the absolute values of the raw input data), the transformed coefficients can then be bit plane encoded, and the bit plane represented data then encoded recursively according to the particular encoding scheme of the technology described herein, as described above. On the other hand, where the check indicates that encoding scheme described according to the technology described herein is not (or is less) suitable, the input data may be encoded (e.g.) in its raw form.

The technology described herein generates data packets having a fixed size. Thus, once the data packet is full, any remaining bits are effectively discarded. The encoding into the fixed size data packet is thus inherently lossy. However, the techniques can also be extended to provide lossless compression, by as well as providing the lossy encoded fixed size data packets, also (separately) providing a further set of data in the form of a "lossless compensation" layer that includes information indicating any (and all) of the remaining bit values required for reconstructing the original input data.

The lossless compensation layer thus contains the information that is required to compensate for the information that is lost when encoding into the fixed size data packet. The lossless compensation layer can then be used in combination with the fixed size data packet to reproduce the original (image) data without any loss.

Thus, in embodiments, when the data packet is full, the method further comprises (the encoding circuitry) generating a lossless compensation layer that includes information indicating the bit values and locations for any bits (and bit planes) for which data was not included into the fixed size data packet so that the lossless compensation layer together with the fixed size data packet contain all of the information required to reproduce the original input data without loss.

The lossless compensation layer thus generally includes information pertaining to any (and all) of the bits that were not included into the fixed size data packet, and which information is therefore needed in order to be able to fully reproduce the original input data. For example, the lossless compensation layer may comprise the raw bit values for any bits that were not encoded into the fixed size data packet (so-called "compensation bits"), along with information indicative of the locations of those bits. For instance, the bit values for the compensation bits may be packed into the lossless compensation layer in a certain order (starting from the first bit value that was not included into the fixed size data packet) and/or the lossless compensation layer may expressly include the location information for the compensation bits (for example, the lossless compensation layer may store the compensation bits in an array or other suitably ordered data structure).

The lossless compensation layer is separate from the fixed size data packet, so that the fixed size data packet may be provided separately and independently from the lossless compensation layer. Thus, where it is desired to guarantee a fixed bit rate, and where it is acceptable to lose some of the original information, the fixed size data packet can be provided (without providing the lossless compensation layer). However, in some cases, it may be desirable to also (separately) provide the lossless compensation layer, to allow for a fully lossless reproduction of the original data.

This may be desirable where, for example, video frames are being encoded, and some frames that have been lossily encoded will need to be used as reference frames (in which case they will need to be reconstructed in a lossless manner by the encoder).

Thus, for the reference frames, an additional lossless compensation layer to allow lossless reconstruction of those frames could be provided by the encoder. (In this case the decoder will in an embodiment still simply receive the lossy encoded version of the frame, because it does not need to reproduce the lossless version of the frame).

In this case, in order to be able to reconstitute the frame completely accurately when doing the lossless encoding (e.g. for use as a reference frame in the encoder), the spatial to frequency domain transformation may need to be perfectly reversible.

However, due to rounding processes, that may not be the case for all forms of frequency domain transformation. For instance, the frequency transform operation in an embodiment comprises multiplying the array of data elements (or a sub-array thereof) by an integer matrix and then rounding the values, e.g. by performing a rounded right shift. However, even where the integer multiplication matrix maps regions to a region of the same volume, errors introduced by the rounding stage can mean that the matrix is not generally invertible.

Thus, in embodiments, at least when performing lossless encoding, a modified frequency domain transformation process may be used, which in particular modifies the rounding operation depending upon the values being rounded, so as to provide a transformation process that can be inverted (reversed) to produce the original unique input. In particular, the rounding operation is configured to avoid two (or more) inputs to the frequency domain transform mapping to the same transformed output (such that when reversing the transformation, you then have unique outputs that can be reversed back to the corresponding unique inputs).

So, in embodiments, the frequency transform operation is configured to transform each data element to a unique frequency domain coefficient output such that the frequency transform operation is reversible.

For instance, when it is identified that rounding may cause two inputs to transform to the same output value, different rounding values may be used for those inputs in order to force the outputs apart and ensure that each input is uniquely transformed.

So, rather than necessarily rounding to the nearest value (as would normally be the case, e.g. when implementing a lossy transform), a biased rounding is in an embodiment used wherein the rounding values are selected so that each input to the transform maps to a unique output so that the transform is fully invertible.

The rounding values may be selected based on the input values. For example, the rounding values may be selected based on a "class" of the values, e.g. which may be determined from the least significant bits of the value. The rounding values may be stored, e.g., in a suitable look up table.

It is also believed that lossless encoding using this lossless frequency transform including a rounding operation configured to select rounding values to ensure that each data element that is being transformed is uniquely mapped is novel and inventive in its own right.

Accordingly, another embodiment of the technology described herein comprises a method of encoding an array of data elements representing a spatial distribution of values, the method comprising:

performing a frequency transform operation on the array of data elements to generate a corresponding set of frequency domain coefficients, the frequency transform operation including a rounding operation, wherein the rounding operation is configured to select rounding values for the values that are being rounded to ensure that each data element that is being transformed is mapped to a unique frequency domain coefficient output; and encoding the set of frequency domain coefficients to provide an encoded representation of the array of data elements.

Another embodiment still of the technology described herein comprises an apparatus for encoding an array of data elements representing a spatial distribution of values, the apparatus comprising an encoder comprising:

transform circuitry configured to perform a frequency transform operation on the array of data elements to generate a corresponding set of frequency domain coefficients, the frequency transform operation including a rounding operation, wherein the rounding operation is configured to select rounding values for the values that are being rounded to ensure that each data element that is being transformed is mapped to a unique frequency domain coefficient output; and encoding circuitry for encoding the set of frequency domain coefficients to provide an encoded representation of the array of data elements.

In this way, it can be ensured that the frequency transform operation is invertible (reversible). So, when the frequency domain coefficients are encoded using a lossless compression technique, the entire encoding process can then be made lossless.

Any suitable frequency transform operation may be used. For example, in an embodiment, the frequency transform operation may comprise multiplying the array of data elements by an integer matrix, and then performing the rounding operation.

In an embodiment, the set of frequency domain coefficients are encoded in the manner of the lossless extension of the technology described herein, as described above, i.e. wherein the frequency domain coefficients are encoded as a plurality of bit plane arrays, and the set of frequency domain coefficients is then encoded as a data packet having a fixed size by encoding the bit plane arrays working from the most significant bit plane downwards until the data packet is full, and wherein a "lossless compensation" layer is then generated, e.g. containing the raw values for any bits not encoded into the fixed size data packet. However, other suitable (lossless) compression schemes may of course be used.

In embodiments, the rounding operation may be chosen to be either a natural "round to nearest" operation or an "invertible" rounding operation, as described above, depending on the application, e.g. depending on whether or not it is desired to provide the lossless compensation layer. This may be signalled within the bit stream, for example, so that the decoder is able to determine which transform operation has been applied.

The encoding of the technology described herein thus generates a data stream that in an embodiment comprises a sequence of fixed size data packets (e.g. each representing an array (or block) of data elements). The encoded data stream generated by the encoder may be output to a memory for storage (e.g. for subsequent decoding and/or transmission) or may be output to an external device (e.g. for subsequent decoding and optionally display).

The technology described herein also extends to corresponding methods and apparatuses for decoding data streams encoding data arrays (e.g. encoded according to the technology described herein).

Another embodiment of the technology described herein comprises a method for decoding a data stream, the data stream comprising a fixed size data packet that encodes a set of frequency domain coefficients as a sequence of bit plane arrays, each bit plane array in the bit plane sequence representing a particular bit position of the frequency domain coefficient values, wherein each bit plane array comprises an array of bits corresponding to the bit values of each of the frequency domain coefficients at the bit position that the bit plane array represents, and wherein the fixed size data packet includes data indicating, for each bit plane array in the bit plane sequence encoded in the fixed size data packet, the location(s) of any sections in that bit plane array that for the first time in the bit plane sequence contain one or more coefficient(s) having a non-zero bit value, as well as data indicating the location(s) of any recursively defined subsections of any such newly active sections in the bit plane array and also any subsections of any sections for which the first non-zero bit value appeared in a previous bit plane array in the bit plane sequence for which subsections the first non-zero bit value in the bit plane sequence appears in the bit plane array, and so on, until the location(s) of the frequency domain coefficient(s) for which the first non-zero bit value appears in the bit plane array are indicated, the method comprising:

determining from the fixed size data packet, for each bit plane array in the bit plane sequence encoded in the fixed size data packet, the location(s) of the frequency domain coefficients for which a non-zero bit value first appears in that bit plane array;

generating using the identified location(s) a plurality of bit plane arrays, each bit plane array in the bit plane sequence representing a particular bit position of the frequency domain coefficient values, wherein each bit plane array comprises an array of bits corresponding to the bit values of each of the frequency domain coefficients at the bit position that the bit plane array represents;

combining the generated bit plane arrays to generate a set of frequency domain coefficients; and using the set of frequency domain coefficients to obtain a decoded output.

Another embodiment of the technology described herein comprises an apparatus for decoding a data stream comprising a fixed size data packet that encodes a set of frequency domain coefficients as a sequence of bit plane arrays, each bit plane array in the bit plane sequence representing a particular bit position of the frequency domain coefficient values, wherein each bit plane array comprises an array of bits corresponding to the bit values of each of the frequency domain coefficients at the bit position that the bit plane array represents, and wherein the fixed size data packet includes data indicating, for each bit plane array in the bit plane sequence encoded in the fixed size data packet, the location(s) of any sections in that bit plane array that for the first time in the bit plane sequence contain one or more coefficient(s) having a non-zero bit value, as well as data indicating the location(s) of any recursively defined subsections of any such newly active sections in the bit plane array and also any subsections of any sections for which the first non-zero bit value appeared in a previous bit plane array in the bit plane sequence for which subsections the first non-zero bit value in the bit plane sequence appears in the bit plane array, and so on, until the location(s) of the frequency domain coefficient(s) for which the first non-zero bit value appears in the bit plane array are indicated, the apparatus comprising a decoder comprising:

input circuitry configured for determining from a fixed size data packet the location(s) for each bit plane array in the bit plane sequence encoded in the fixed size data packet of the frequency domain coefficients for which a non-zero bit value first appears in that bit plane array;

bit plane decoding circuitry configured for generating using the identified location(s) of the frequency domain coefficients for each bit plane array a plurality of bit plane arrays, each bit plane array in the bit plane sequence representing a particular bit position of the frequency domain coefficient values, wherein each bit plane array comprises an array of bits corresponding to the bit values of each of the frequency domain coefficients at the bit position that the bit plane array represents; and for combining the generated bit plane arrays to generate a set of frequency domain coefficients; and output circuitry configured for using the set of frequency domain coefficients to obtain a decoded output.

The decoding process thus essentially works in reverse to the encoding scheme of the technology described herein by first identifying from the fixed size data packet the positions of the active coefficients within each bit plane in the bit plane sequence that has been encoded within the fixed size data packet (i.e. before the fixed data packet size was reached) to generate a set of bit plane arrays and then reconstructing from the plurality of bit plane arrays a set of coefficients (representing the frequency transformed coefficients for the originally encoded input data) which can then be used to obtain a decoded output. For example, when the coefficients represent a set of frequency transformed coefficients, the decoding method in an embodiment comprises a step of performing an inverse frequency transform operation to the frequency transformed coefficients to (re)construct the original data array that was encoded.

In an embodiment the encoded data stream also includes data indicating the sign values for the frequency domain coefficients (newly) appearing in each bit plane array and also the refinement bit values for each of the bit planes in question, as described above. Thus, the decoding in an embodiment comprises as well as determining from the fixed size packet the location(s) of the frequency domain coefficients for which a non-zero bit value first appears in a given bit plane array, determining the sign values for these frequency domain coefficients. In an embodiment, the decoding also comprises determining, for each bit plane in the bit plane sequence encoded in the fixed size data packet, the refinement values for the bit plane in question (i.e. the bit values for any frequency domain coefficients that first appeared in a previous bit plane in the bit plane sequence).

Because the encoding into the fixed size data packet is lossy, there may be some coefficients where at least some information is not included in the fixed size data packet.

For any coefficients where the sign is known but the bit value is not known (since this information was discarded during the encoding), in embodiments the decoding scheme introduces a "1" in that position in the next bit plane down in the bit plane sequence (where there is a lower bit plane available) (this effectively adds a contribution of "½" for the unknown bit value). That is, in embodiments, for any bit values in a given bit plane array that are not included in the fixed size data packet, but for which the sign is known, the decoding comprises (when generating the bit plane arrays) including a zero at that position in the bit plane array, and including a one at the corresponding position in the next bit plane down in the bit plane sequence.

This has been found to provide a better quality reproduction (e.g. compared to simply defaulting the value to "0). This may then be carried on through the lower bit planes in the bit plane sequence (where the bit values will also normally not be known, since the encoding of the technology described herein works downwardly through the bit plane sequence) by introducing suitable values for the other bit planes in the sequence, e.g. according to a predetermined decoding pattern. For example, the decoding might introduce a "1" into every other bit plane in the sequence (e.g. so that a value of 1XXXX, where X represents an unknown bit value, is decoded as 10101). Alternatively, after introducing a "1" for an unknown bit value in the corresponding position in the next bit plane down, a "0" may then be introduced for all of the lower bit planes (e.g. so that 1XXXX is instead decoded as 10100). As another example, the decoding may introduce a "1" into the n−1, n−2 and n−4 bit planes (where available) (e.g. so that 1XXXXXXX would be decoded as 10110100), and this has been found to give good results. However, it will be appreciated that various other suitable patterns may be used for this decoding.

On the other hand, for any coefficients where the sign value is unknown, the value for that coefficient is in an embodiment decoded as zero, i.e. the bit values for that coefficient are in an embodiment set to "0" for each of the bit planes in the bit plane sequence. In this situation, it may be better to set the coefficient value to "0" (e.g. rather than attempting to guess, or somehow determine, the sign value). That is, in embodiments, any bit values in a given bit plane that are not included in the fixed size data packet, and for which the sign is not known, are decoded as a zero. So, for example, a coefficient having a bit value (magnitude) of 1XXXX, but for which the sign value is unknown, is just decoded as "0".

In general, the decoder is operable to decode the data stream to recover the original source data (e.g. image) that was encoded, and then use (e.g. display) this data as desired. Thus, once the data stream has been decoded, the decoder may then be configured to display, or output for display, data obtained using the decoded independent segments.

The encoding and decoding apparatuses discussed above may generally be provided as part of a data processing system. For example, the apparatuses may comprise part of an image and/or video processing system that includes a camera, such as a digital camera, mobile phone or tablet.

In general, the processes described herein in any embodiment may be performed by any desired and suitable apparatus. For example, the processes described herein in any embodiment may be performed by an image or video processor (codec). The data processing apparatus described herein in any embodiment may therefore comprise or may be a video processor. Thus, the processing (encoding/decoding) circuit/circuitry, output circuit/circuitry, header generating circuit/circuitry, header reading circuit/circuitry or input circuit/circuitry, etc. described herein in any embodiment may form part of a video processor. The data processing apparatus described herein in any embodiment may comprise, or may be, or may form part of, a system on chip (SoC).

As will be appreciated by those skilled in the art, the encoding/decoding apparatus of the technology described herein may be part of an overall data processing system that includes, for example, a host (e.g. central) processor. The host processor may, for example, execute applications that require data processing by the encoding/decoding apparatus. The host processor may send appropriate commands and data to the encoding/decoding apparatus to control it to perform the data encoding/decoding operations and to generate and/or use an output required by applications executing on the host processor. To facilitate this, the host processor may execute a driver for the encoding/decoding apparatus.

In embodiments, the apparatus or system may comprise, and/or may be in communication with, one or more memories and/or memory devices that store the data described herein, and/or store software for performing the processes described herein. The apparatus or system may comprise, and/or may be in communication with a display for displaying images based on the data elements of the arrays. The apparatus or system may comprise, and/or may be in communication with a camera that generates the arrays of data elements.

The memory referred to herein may be any desired and suitable memory of or for the data processing apparatus. The memory may be external to the data processing apparatus, e.g. video processor and/or system on chip (SoC). The memory may be, for example, main system memory.

The technology described herein can be used for all forms of data arrays that a data processing apparatus may provide and/or use, such as images or frames for display. Thus, as indicated above, the arrays of data elements may comprise image data and/or may correspond to images or frames of image data.

In an embodiment, the various functions of the technology described herein are carried out on a single data (e.g. image) processing platform that provides and/or uses the arrays of data elements.

The technology described herein can be implemented in any suitable system, such as a suitably configured computer or micro-processor based system. In an embodiment, the technology described herein is implemented in a computer and/or micro-processor based system.

The various functions of the technology described herein can be carried out in any desired and suitable manner. For example, the steps and functions of the technology described herein can be implemented in hardware or software, as desired. Thus, for example, unless otherwise indicated, the various circuits/circuitry, functional elements, stages, and "means" of the technology described herein may comprise a suitable processor or processors, controller or controllers, functional units, circuits/circuitry, processing logic, microprocessor arrangements, etc., that are operable to perform the various steps or functions, etc., such as appropriately dedicated hardware elements (processing circuits/circuitry) and/or programmable hardware elements (processing circuits/circuitry) that can be programmed to operate in the desired manner.

In particular, it is contemplated that the encoder may be implemented either in hardware or software, as desired. Thus, for example, the encoder may comprise a suitable processor or processors, controller or controllers, functional units, (encoding) circuits/circuitry, processing logic, microprocessor arrangements, etc., that are operable to perform the various encoding steps or functions, etc., as described herein such as appropriately dedicated hardware elements (processing circuits/circuitry) and/or programmable hardware elements (processing circuits/circuitry) that can be programmed to operate in the desired manner.

Similarly, the decoder can be implemented in hardware or software, as desired. Thus, for example, the decoder may comprise a suitable processor or processors, controller or controllers, functional units, (decoding) circuits/circuitry, processing logic, microprocessor arrangements, etc., that are operable to perform the various encoding steps or functions, etc., as described herein such as appropriately dedicated hardware elements (processing circuits/circuitry) and/or programmable hardware elements (processing circuits/circuitry) that can be programmed to operate in the desired manner.

The various steps or functions, etc., of the technology described herein may be duplicated and/or carried out in parallel on a given processor. Equally, the various processing stages may share processing circuits/circuitry, etc., if desired.

Subject to any hardware necessary to carry out the specific steps or functions, etc., discussed above, the system can otherwise include any one or more or all of the usual functional units, etc., that data processing apparatus and/or systems include.

The various data processing stages can accordingly be implemented as desired and in any suitable manner, and can perform any desired and suitable functions, respectively. Similarly, the various data can be defined and stored in any suitable and desired manner.

It will also be appreciated by those skilled in the art that all of the described embodiments of the technology described herein can, and in an embodiment do, include, as appropriate, any one or more or all of the features described herein.

The methods in accordance with the technology described herein may be implemented at least partially using software e.g. computer programs. Thus, further embodiments of the technology described herein comprise computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processor. The data processor may be a microprocessor system, a programmable FPGA (field programmable gate array), etc.

The technology described herein also extends to a computer software carrier comprising such software which when used to operate a data processing apparatus or system comprising a data processor causes in conjunction with said data processor said apparatus or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus in further embodiments comprise computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CD, DVD, ROM, RAM, flash memory, or hard disk. It could also comprise a series of computer readable instructions transmittable to a computer system, via a modem or other interface device, either over a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology described herein, present or future, including but not limited to optical, infrared, or microwave. It is contemplated that such a computer program product may be distributed as a removable medium with accompanying printed or electronic documentation, for example, shrink wrapped software, pre-loaded with a computer system, for example, on a system ROM or fixed disk, or distributed from a server or electronic bulletin board over a network, for example, the Internet or World Wide Web.

FIG. 1 shows schematically an embodiment of a data processing system 200 that can provide and use data arrays, such as images or video frames for display, that have been encoded in the manner of the technology described herein. It will be appreciated that FIG. 1 merely shows one example of a system that is suitable for use with the technology described herein, and that various other arrangements are possible.

In this embodiment, the system 2000 comprises a data processing apparatus in the form of a system on chip (SoC)

2020. The system 2000 also comprises off-chip (main) memory 2160, a display device 2180 and a video camera 2200.

The SoC 2020 comprises a central processing unit (CPU) 2040, a graphics processing unit (GPU) 2060, an image/video processor 2080, a display controller 2100, an interconnect 2120 and a memory controller 2140.

As is shown in FIG. 1, the CPU 2040, GPU 2060, image/video processor 2080, and display controller 2100 communicate with each other via the interconnect 2120 and with the memory 2160 via the interconnect 2120 and memory controller 2140. The display controller 2100 also communicates with the display device 2180. The video camera 2200 also communicates with the SoC 2020 via the interconnect 2120.

In embodiments, the image/video processor 2080 reads in image data from memory 2160, encodes the image data (e.g. in the manner of the technology described herein), and then outputs that encoded image data, e.g. for storage in memory 2160 or for streaming to another device. The encoded image data can later be retrieved and decoded, e.g. by the image/video processor 2080, or received and decoded by another device. The decoded image data can then be output, e.g. by the display controller 2100 to the display device 2180 or by another device, for display.

Thus, within such data processing systems it may be desired at various points to be able to compress the image data that is being processed. Furthermore, in order to be able to facilitate higher throughput, e.g. for higher bandwidth media applications, it may be desirable to be able to guarantee a given bandwidth (bit rate).

Figure 2:
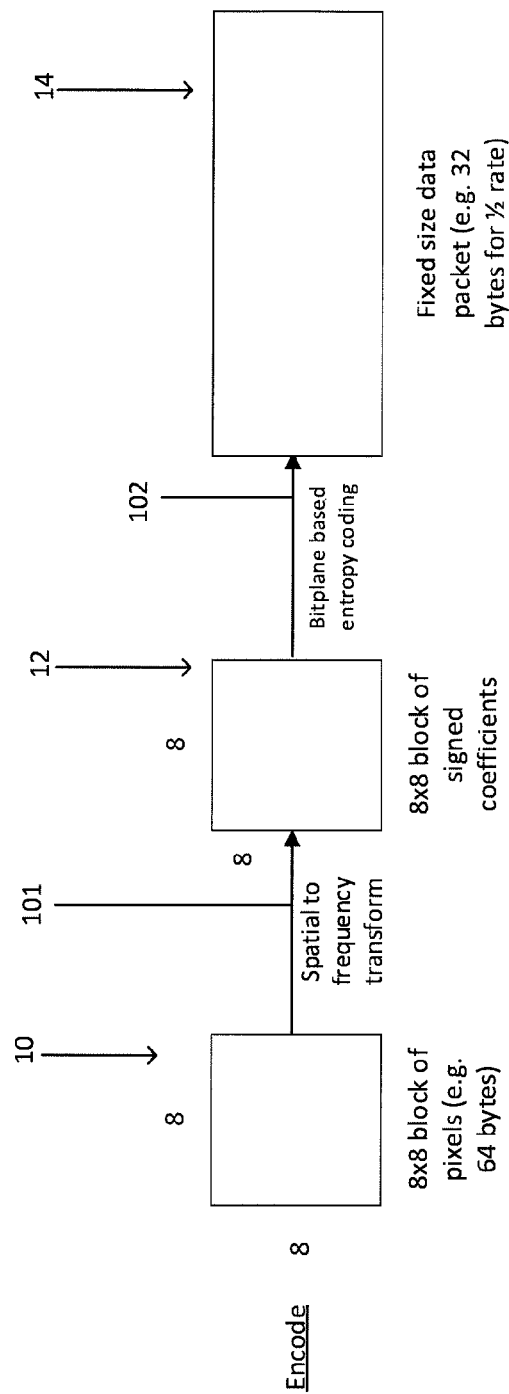
FIG. 2 schematically illustrates a fixed rate encoding process according to embodiments of the technology described herein.

The technology described herein thus relates in embodiments to an encoding scheme that is capable of encoding the image data into a data packet having a fixed size, and thus guaranteeing a desired bit rate. For example, FIG. 2 schematically illustrates a fixed rate encoding scheme according to an embodiment of the technology described herein. In particular, in the example shown in FIG. 2, the input is an 8×8 block of pixels 10 (e.g. 64 bytes) that is to be encoded. This may represent, for example, a single block of image data, so that the arrangement of the pixels thus represents the spatial distribution of the image data within that block.

To provide some of the initial compression, a spatial to frequency transform, such as a discrete cosine transform (DCT), or similar, is applied to this block 10 (step 101) to generate a corresponding 8×8 block of signed frequency transformed coefficients 12. The block of frequency transformed coefficients 12 is then encoded into a fixed size data packet 14 (e.g. of 32 bytes, for half rate encoding) using bit plane based entropy coding (step 102). This is performed in such a manner, as will be explained further below, that the image data is efficiently compressed whilst still ensuring the desired fixed size for the data packet 14.

Although FIG. 2 shows an 8×8 block of pixels 10, it will be appreciated that the technology described herein may be applied to any suitable array of data elements. For instance, in order to illustrate the encoding scheme of the technology described herein, a worked example will now be described in relation to the 4×4 block of coefficients shown in FIG. 3A. However, although a 4×4 block of coefficients is chosen (e.g. for ease of illustration) it will be appreciated that the technology described herein is not limited to any particular size or form of data array.

FIG. 3A shows an example of a typical block of frequency domain coefficients (i.e. obtained from step 101 in FIG. 2) comprising a 4×4 array of signed values within the range −63 to +63 (so that the absolute values are stored using 6 bits). The technology described herein can then encode these coefficients as a fixed size data packet.

To do this, the coefficients are first represented as a series of bit plane arrays with each bit plane array representing the bit values (i.e. "1" or "0") for each of the frequency domain coefficients at the respective bit position that the bit plane array represents. That is, the absolute values are decomposed into a set of six binary bit planes as shown in FIG. 3B.

The set of bit plane arrays are then encoded in sequence working from the top bit plane downwards until the desired data packet size is reached. That is, the technology described herein proceeds to encode each of the bit planes in turn, so that, provided there is available space in the data packet, a given bit plane is encoded in full before moving on to the next bit plane, and so on. However, when the data packet is full, the encoding is stopped, with any bits (and bit planes) not yet encoded then not being included into the data packet. In this way it can be ensured that the data packet does not exceed the desired fixed size. Furthermore, because the encoding scheme works downwardly from the top bit plane, this ensures that the more significant bit planes are preferentially encoded before the bit planes representing the less significant bits so that if information is lost (due to the encoding being stopped before that information has been included into the data packet) the information in the higher bit planes is still encoded.

Often, the highest bit planes may be empty (containing only "0"s). For example, this is the case in FIG. 3B for the two highest bit planes. This information can be efficiently encoded by simply including in the data packet a "0" for each such "inactive" (empty) layer in the sequence of bit planes leading up to the first bit plane containing a non-zero value is reached (the first "active" bit plane). When the first such "active" bit plane is reached, this can be indicated, e.g. by including a "1". Once the position of the first active bit plane in the bit plane sequence is identified in this way, each of the bit planes starting from the first active bit plane can then be encoded according to the particular encoding scheme of the technology described herein, e.g. as described below.

Figure 4:
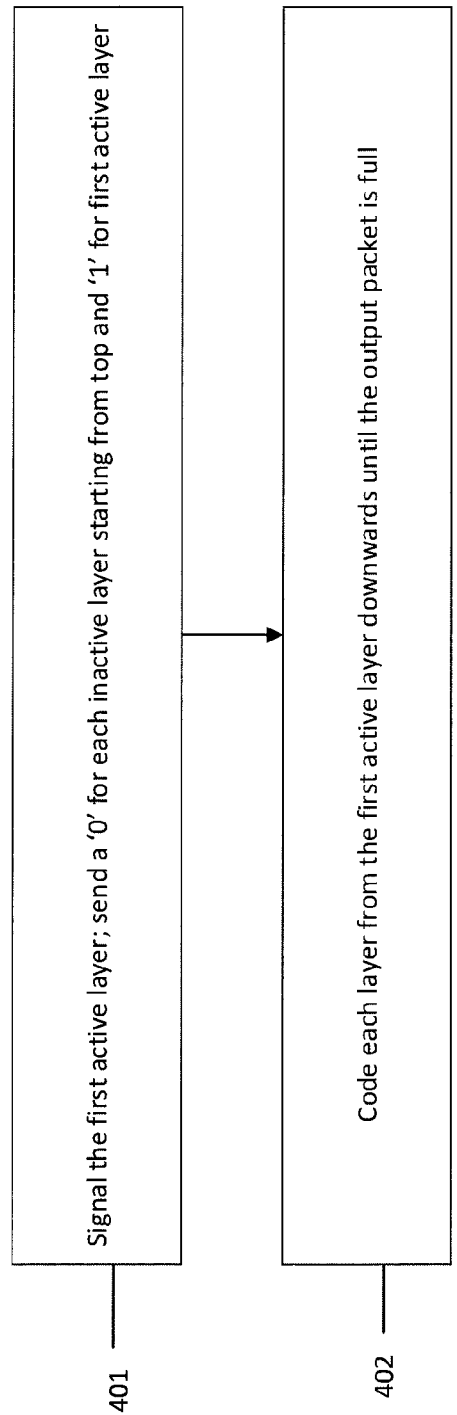
FIG. 4 is a flow chart illustrating an overview of an encoding process according to an embodiment of the technology described herein.

Thus, as shown in FIG. 4, the encoding starts by signalling the first active layer (step 401). For example, working through the sequence of bit plans from the highest bit plane downwards, a '0' is sent for each inactive layer and a '1' is then sent for the first active layer. For instance, for the set of bit planes shown in FIG. 3B, the first two bit planes ('bit plane 5' and 'bit plane 4') are empty, and the first active layer is 'bit plane 3', which contains the most significant bit for the top left value (which has an absolute value of '13' and so, in binary representation, '001101'). This information can therefore be encoded by including at the start of the code the values '001' (i.e. indicating that the first two bit planes are empty and the third bit plane in the bit plane sequence is the first active bit plane).

The encoding scheme shown in FIG. 4 then proceeds by encoding each bit plane (layer) from the first active bit plane downwards in turn until the data packet is full (until the desired fixed data packet size is reached) (step 402). So, for the example shown in FIG. 3B, after signalling that 'bit plane 3' is the first active bit plane, the encoding scheme then proceeds to encode the bit values for that bit plane, and then moves down to the next bit plane ('bit plane 2'), and so on, encoding each of the bit planes until the data packet is full (or until all of the bit planes have been encoded, if the desired fixed data packet size is not reached by this point).

The particular encoding scheme of the technology described herein encodes the locations of any newly "active"

coefficients within a bit plane in a recursive manner by repeatedly subdividing the bit plane into sections (e.g. quadrants) and identifying any sections that newly contain the most significant bit of a coefficient and so on down to the individual locations of the coefficients, Also, the information in each bit plane is encoded relative to the information in the preceding bit plane in the sequence. The Applicants believe that this encoding scheme is able to compress the data in a particularly efficient manner, whilst still guaranteeing a fixed bit rate. In particular, this encoding scheme is able to efficiently compress a large number of leading "zeros", which are often found when processing image data in the frequency domain.

An example variable length code that can be used in embodiments for signalling the location(s) of the newly active quadrants and coefficients is presented in Table 1 below. This code is context dependent so that for each quadrant (or sub-quadrant, or individual data element) containing any newly active coefficients, this information can be signalled based on the number of locations know to contain significant bits in the layer above. Thus, relatively complex bit dependencies can be encoded in a relatively simple manner, using a relatively low cost (low complexity) variable length code table like that presented in Table 1 below. Again, this generally has the effect of more efficiently compressing the data values.

TABLE 1

Example code for coding locations of bits

| Number of sections (e.g. quadrants/sub-quadrants/elements) that do not contain significant bits in the above layer and names of those sections | Code for no new significant section | Code for x is now significant in the current layer, but y and later sections are not | Code for y is now significant in the current layer, but z and later sections are not | Code for z is now significant in the current layer, but z and later sections are not | Code for w is now significant in the current layer |
|---|---|---|---|---|---|
| 0 | — | — | — | — | — |
| 1 named x | 0 | 1 | — | — | — |
| 2 named x, y | 0 | 10 | 11x | — | — |
| 3 named x, y, z | 0 | 10 | 110x | 111yx | — |
| 4 named x, y, z, w | — | 0 | 10x | 110yx | 111zyx |

Figure 5:
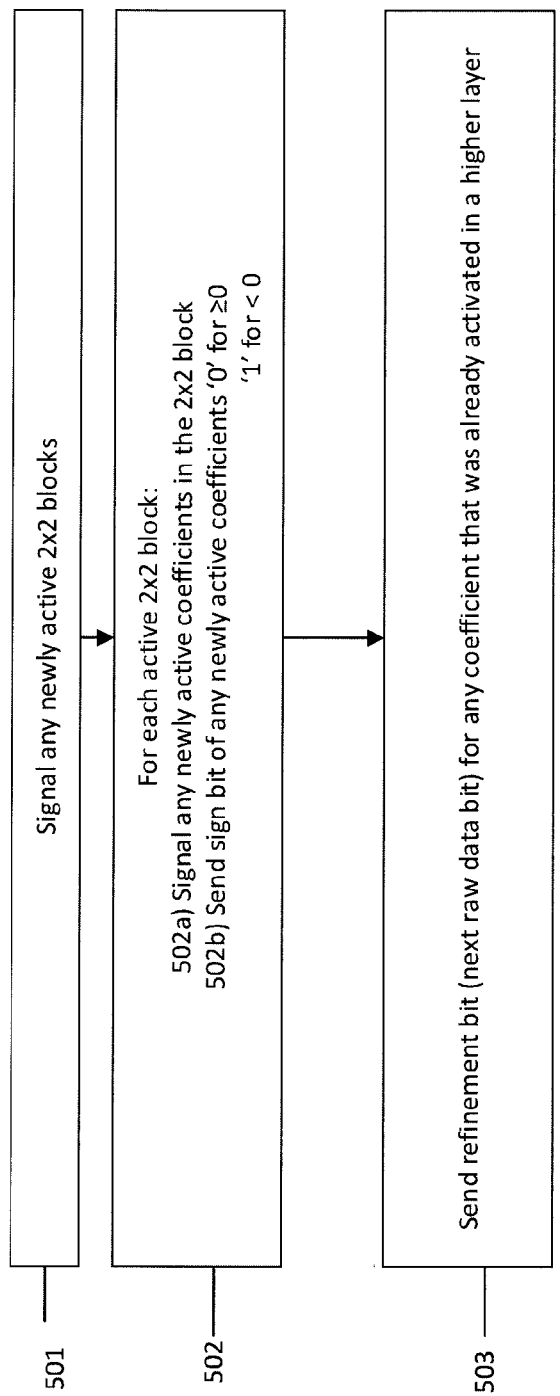
FIG. 5 is a flow chart illustrating how each bit plane array in a sequence of bit planes can be encoded according to embodiments of the technology described herein

FIG. 5 illustrates the encoding scheme for a particular bit plane comprising a 4×4 bit plane array (e.g. of the type shown in FIG. 3B). As shown in FIG. 5, for each bit plane array that is being encoded, the bit plane array is first divided into four 2×2 quadrants, and any quadrants that are "newly active" in that bit plane are then signalled (step 501). (A quadrant is "newly active" in a bit plane if that quadrant for the first time in the bit plane sequence includes a non-zero bit value.) Once a quadrant has been made active, it then remains active for the encoding of the subsequent bit planes in the bit plane sequence.

Thus, for each currently active quadrant in the bit plane array (including any quadrants that are newly active in that bit plane as well as any quadrants previously "activated" during the encoding of a previous bit plane array in the bit plane sequence) (step 502), and so long as there is still available space in the data packet (otherwise the encoding is stopped one the desired fixed size is reached), the location(s) of any newly active coefficients in that quadrant are signalled (step 502a), as well as the respective sign bits for any such newly active coefficients (step 502b). (The sign bits may be indicated using a suitably assigned value, e.g. by sending a "0" if the sign is ≥0 and a "1" if the sign is <0 (or similar).) Finally, once the location(s) and sign bits for any newly active coefficients have been sent for each active quadrant, so-called "refinement bits" representing the raw (absolute) bit values for any coefficients that were already activated in a higher bit plane are then sent (step 503).

Thus, for each bit plane, so long as there is available space in the data packet, data is included in the data packet that indicates the location(s) of any coefficients that are newly active in the bit plane (i.e. whose leading bit ("1") appears at the bit position represented by the bit plane), as well as the sign values thereof, and also the raw (absolute) bit values for any coefficients whose leading bit appeared in a previous plane (so the values following the leading bit).

FIG. 6 is a worked example showing how the set of bit plane arrays illustrated in FIG. 3B can be encoded using the variable length coding scheme presented in Table 1.

For instance, as described above, the encoding starts with the first active bit plane which in this example is 'bit plane 3'. Working clockwise from the top left corner it can be seen that the first 2×2 quadrant (top left) of 'bit plane 3' contains a non-zero coefficient, whereas the other quadrants are all empty. Thus, the first (top left) coefficient is signalled as being "active" (step 501), e.g. by sending a "0", as indicated in Table 1 above (since there are no active quadrants in the preceding layer).

The encoding scheme then proceeds as described above to subdivide this first active quadrant again into its four individual data elements (each representing a single coefficient). Here, it can be seen that within the first active quadrant, the first (top left) coefficient is active (whereas the others are empty), and so a further '0' is added to the code (step 502a).

The sign of this coefficient is positive, so another '0' is added to indicate the sign value (step 502b).

However, there are no refinement bits at this stage (since 'bit plane 3' is the first active bit plane so there are no values from the layer above), and so the code at this stage is:

'001' (signalling that 'bit plane 3' is the first active layer)
'000' (signalling that within this bit plane, the first coefficient is active, and has a positive sign).

The encoding scheme then moves to the next bit plane ('bit plane 2'), and proceeds to encode that in the same way. For example, for 'bit plane 2' it can be seen that a second quadrant (bottom left) is now active, and this is therefore signalled accordingly, e.g. as '1100'. There are no new coefficients in the first quadrant (which was already active), so a '0' is then sent to indicate this. However, the fourth coefficient of the second quadrant is active and this can be signalled as '111000'. The sign of this new coefficient is negative, so a '1' is added as the sign value, and the refinement bit '1' for the first coefficient is finally added (step 503). The code at this stage is now:

'001' '000' (from the encoding of 'bit plane 3')

'1100' '0' '111000' '1' '1' (from the encoding of 'bit plane 2').

The encoding can then be repeated for the final two bit planes (or at least until the data packet is full).

So, for 'bit plane 1', a new block is active, and a '10' is added to the code.

There are no new active coefficients in the first quadrant (top left), so a '0' is sent, but the first two coefficients in the second quadrant (top right) are now active, and so '101' is added to the code. The sign values for these coefficients are then added ('00', since these are both positive), and a further '0' is then sent indicating that there are no new active coefficients in the third quadrant (bottom left). The refinement bit values ('00') for the two already active coefficients are sent.

Finally, for 'bit plane 0', the remaining block (bottom right) is now active, and this is signalled by adding '1' to the code. The positions and sign values for the two newly active coefficients in the first quadrant are then added ('1101' '10'), followed by an indication that there is no change in the second quadrant ('0'), and then the position and sign value for the new coefficient in the third quadrant ('10' '0'), and the position of the new coefficient in the final quadrant ('11000'). The refinement bits ('1011') for the four coefficients activated in the previous bit planes are then added.

Thus, in this way, by encoding the information for each bit plane in a context-dependent manner, wherein the information for each bit plane is encoded based on the information from the preceding layer, the relatively complex significant bit dependencies can be encoded efficiently, and using a relatively simple variable length code. It can also be seen that the code shown in Table 1 is biased towards new coefficients first appearing in the top left corner, which will typically be the case after a frequency transform. However, other suitable coding schemes may of course be used.

Figure 7:
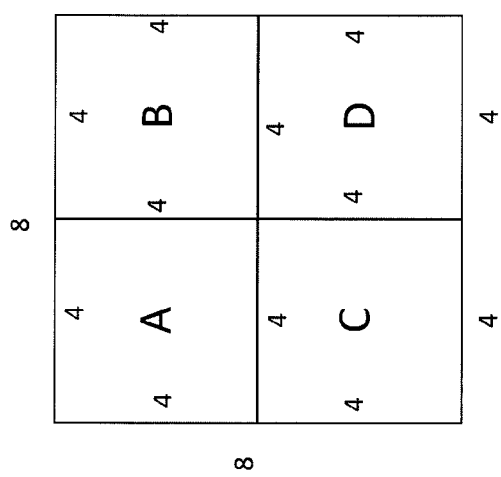
FIG. 7 shows schematically an example of encoding an 8×8 block according to an embodiment of the technology described herein.

The example presented above is for encoding a 4×4 array. However, it will be appreciated that the encoding scheme may of course also be used for other (larger) arrays. For instance, FIG. 7 shows an example of encoding an 8×8 array of data elements. In this case, for each bit plane array that is to be encoded, the code first signals which 4×4 blocks (quadrants) are newly active, and for each 4×4 block then proceeds to encode the locations and signs of the coefficients for the 4×4 blocks (working clockwise from the top left) (i.e. steps 501 and 502). Finally, the refinement bits are encoded for each of the 4×4 blocks in order (step 503). The encoding then moves down to the next bit plane, and so on, until the data packet is full.

Figure 8:
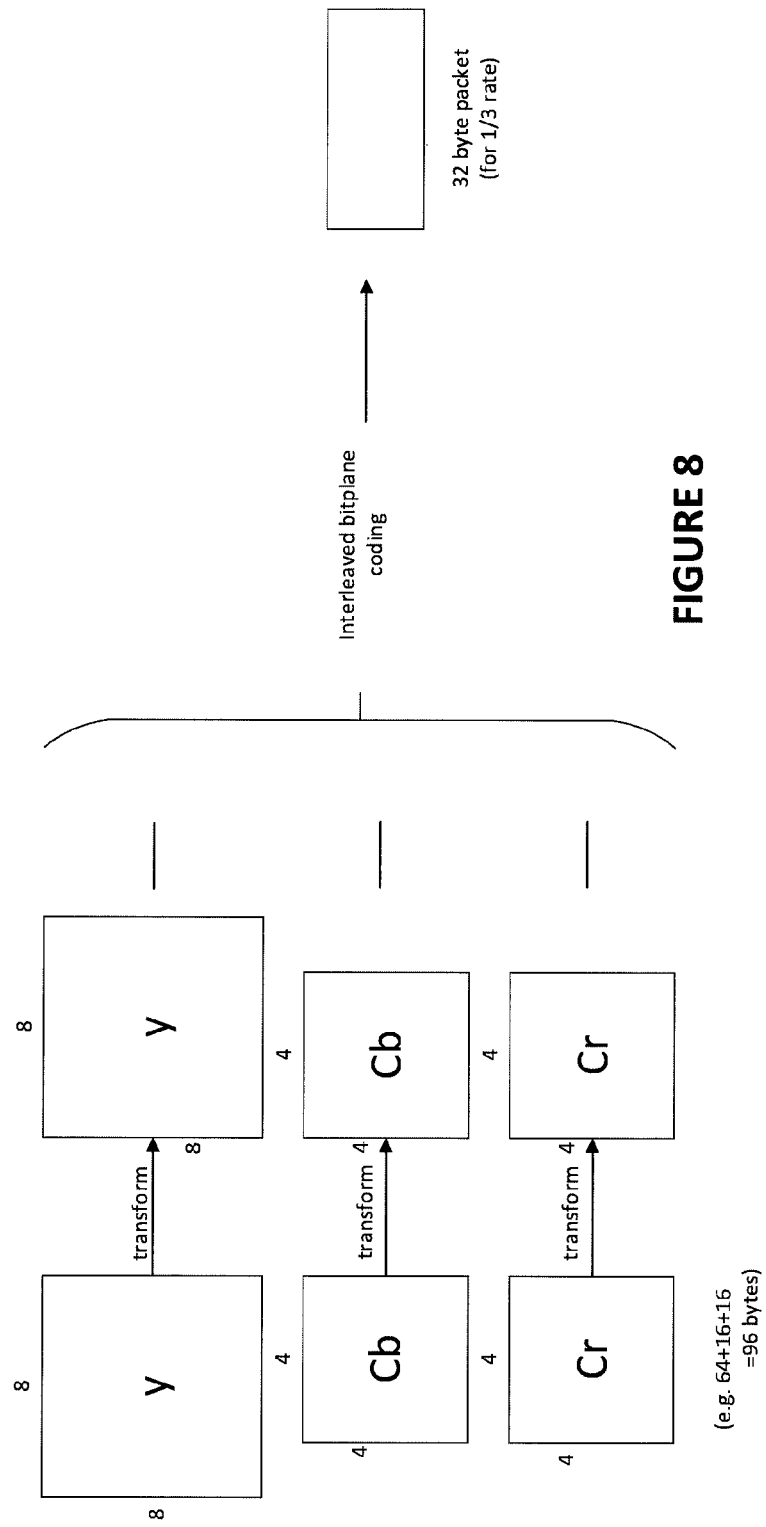
FIG. 8 illustrates schematically a multi-plane encoding process according to an embodiment of the technology described herein.

It will also be appreciated that the encoding scheme may be used for multi-plane encoding. For example, this may be the case where each data element is associated with multiple channels (e.g. YUV values). In this case, as shown in FIG. 8, there may be three sets of bit plane arrays, one for each of the channels. In this case, the bit plane arrays for the three planes are in an embodiment encoded in an interleaved manner so that the locations of the newly active bits for each channel are in an embodiment encoded one after another before encoding the refinement bits for each data channel.

Figure 9:
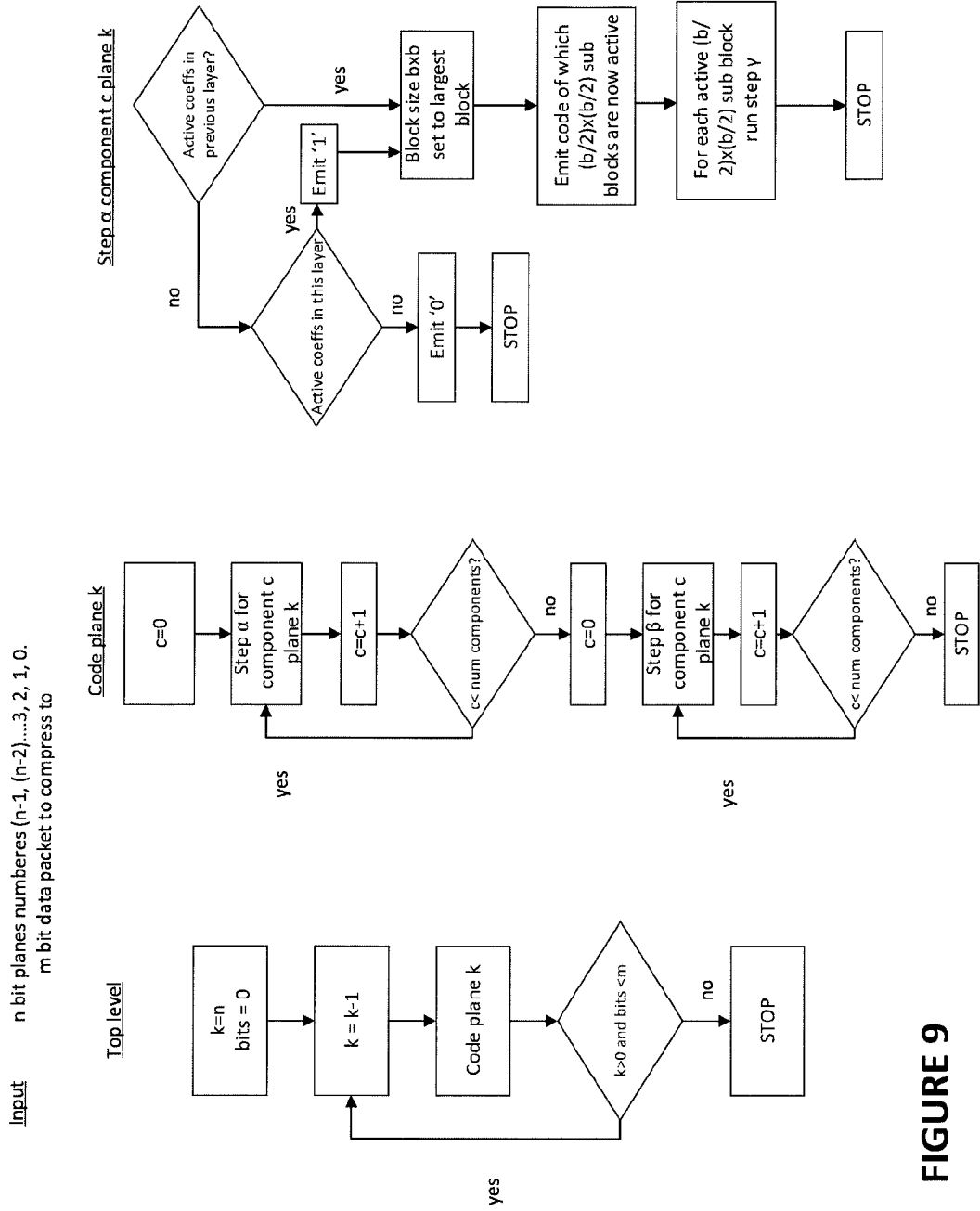
FIG. 9 is a flow chart showing the encoding process according to an embodiment of the technology described herein.

FIG. 9 is a flowchart showing the data flow during the encoding process. The input is a set of n bit planes (numbered (n−1), (n−2), . . . , 1, 0) that are to be compressed into an m bit data packet. At the top level, the encoding process works from the top bit plane (n−1) downwards and encodes each of the bit planes in turn until the data packet is full. The encoding of each bit plane works by subdividing the bit plane into a plurality of quadrants and indicating any newly active coefficients, as well as their sign bits, and the refinement bits for previously active coefficients, in the same manner described above.

The encoding of the technology described herein thus generates a data stream that in an embodiment comprises a sequence of fixed size data packets (e.g. each representing an array (or block) of data elements). The encoded data stream generated by the encoder may be output to a memory for storage (e.g. for subsequent decoding and/or transmission) or may be output to an external device (e.g. for subsequent decoding and optionally display).

Figure 10:
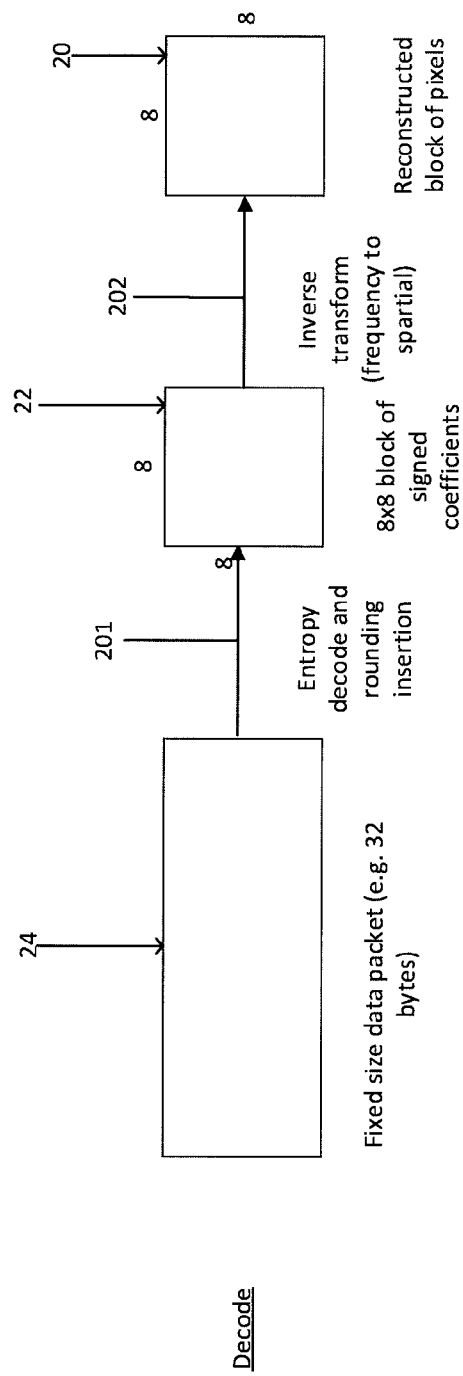
FIG. 10 illustrates schematically a decoding process according to an embodiment of the technology described herein.

For example, the encoded data stream can then be decoded essentially by the reverse process of the encoding scheme described above. For example, FIG. 10 illustrates schematically a decoding process according to an embodiment of the technology described herein wherein a fixed size data packet 24 (e.g. 32 bytes) is entropy decoded (step 201), with rounding insertion, in order to (re)construct an 8×8 block of signed frequency domain coefficients 22, to which an inverse frequency to spatial transform is then applied (step 202) in order to reconstruct the 8×8 block of pixels 20 (i.e. the original input data that was encoded into the fixed size data packet). FIG. 10 essentially shows the inverse process of the encoding scheme illustrated in FIG. 2. Thus, although FIG. 10 shows an example of generating a decoded output in the form of an 8×8 block of pixels, it will be appreciated that the decoding scheme may be applied to any other suitably encoded data stream, as desired.

Thus, the decoding process starts by reading the fixed size data packet to identify the locations and signs of the newly active coefficients in each of the bit planes, and then combining the bit planes together to generate a set of coefficients that can then be transformed back into the spatial domain to obtain the original input. Naturally, because the encoding scheme is lossy (and stops when the desired fixed size is reached), not all of the information for each of the bit planes will be available in the fixed size data packet.

Figure 11:
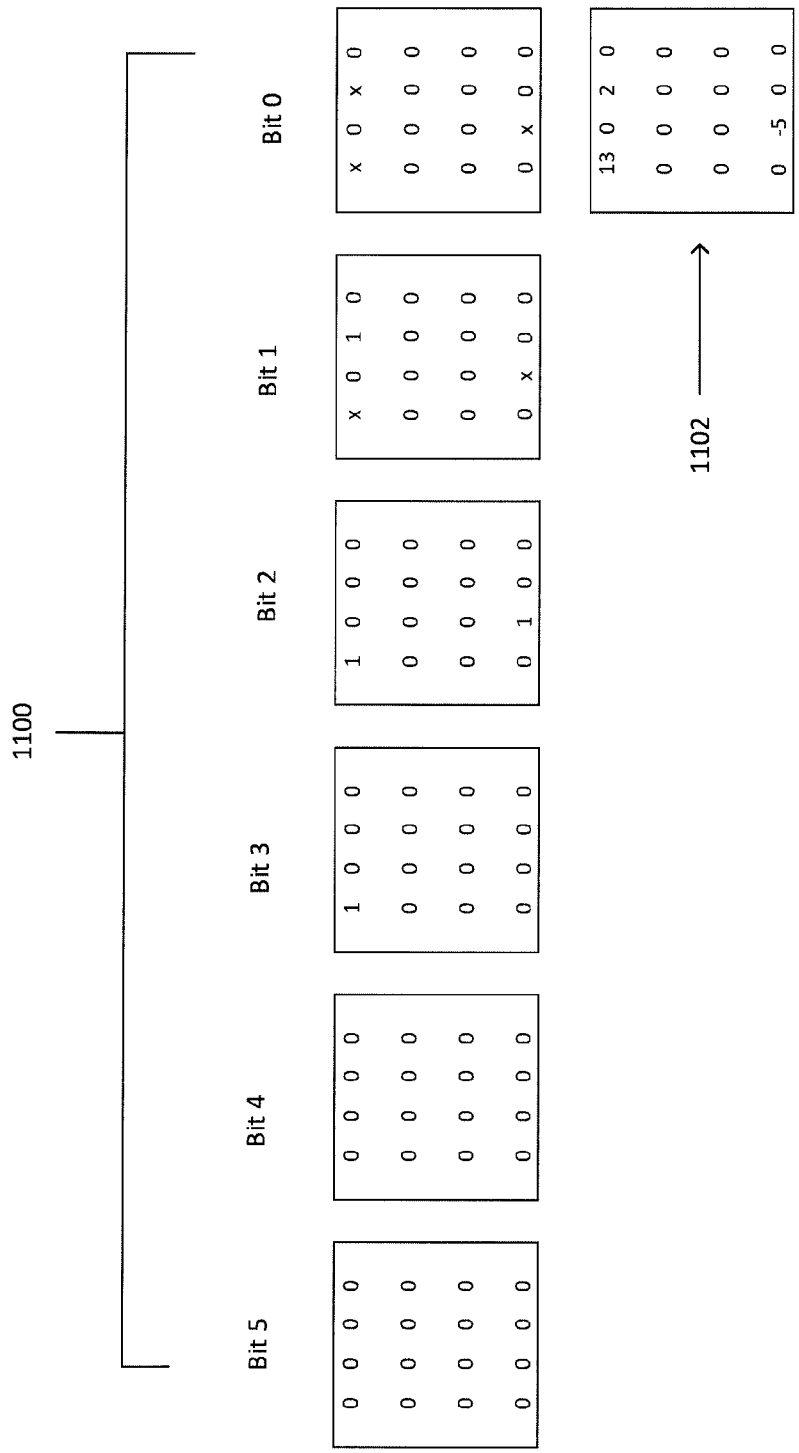
FIG. 11 illustrates an example of a decode process according to an embodiment of the technology described herein.

For instance, FIG. 11 illustrates an example of a decode process according to the scheme presented in FIG. 10 for a 4×4 block. In particular, FIG. 11 shows a set of six bit planes 1100 that have been decoded from a fixed size data packet, e.g. as described above. However, for 'bit plane 1' and 'bit plane 0' there is some information that was not encoded in the fixed size data packet. These coefficients are indicated by an 'X'.

In order to reconstruct the set of coefficients 1102, rather than simply setting the unknown values (the 'X's) to zero, at least where the sign value is known, a '1' is inserted into the layer below. Thus, for the top left coefficient, which is encoded as '11XX', this is assigned a value of '13' (i.e. '1100'+'0001'). Similarly, the coefficient '1XX' is assigned an absolute value of '5' ('101'). The coefficient '1X' is assigned a value of '2' ('10') since there are no lower layers. This has the effect of introducing a "½" value, and has been found to provide a more accurate reproduction (e.g. as compared to setting the unknown values to "0", or "1").

Figure 12:
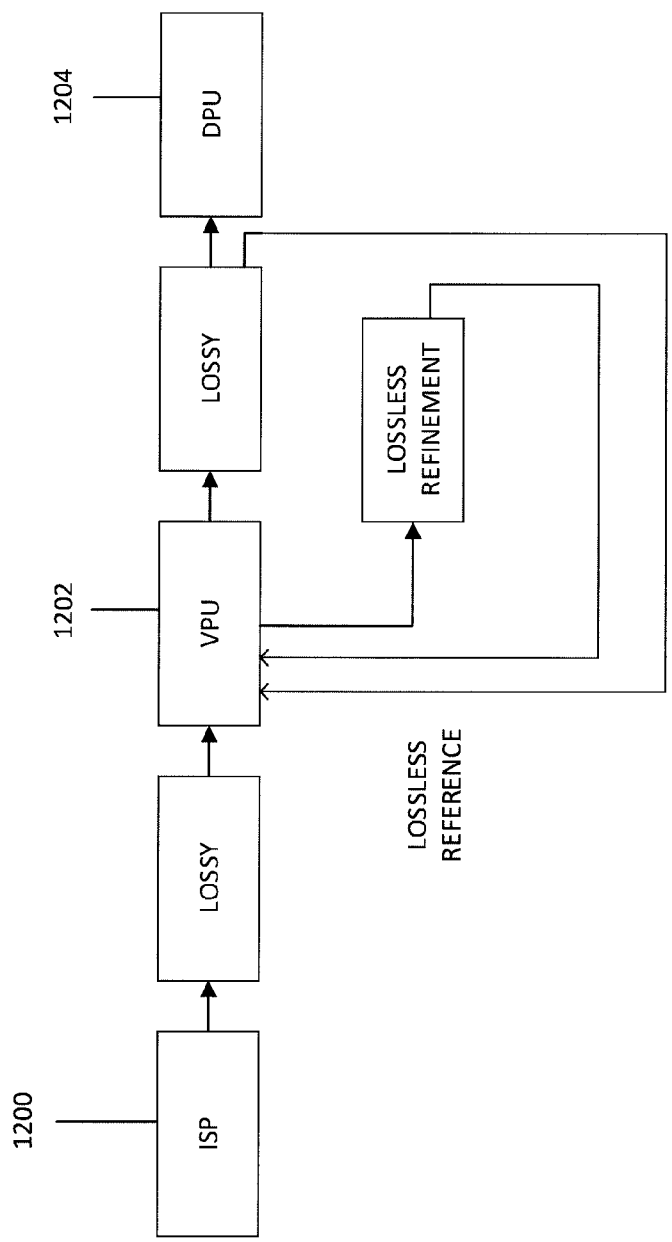
FIG. 12 schematically illustrates an example of a lossless extension to the encoding scheme according to embodiments of the technology described herein.

The examples described above generally relate to lossy compression, wherein in order to guarantee a fixed bit rate, the encoding is stopped when the desired fixed size is reached so that some of the original information is lost (and the original data e.g. image cannot be perfectly (losslessly) reproduced). Lossy frame buffer compression is very important for video and image processing to provide a guaranteed reduced memory bandwidth for high resolution picture buffers. However, there are some situations where a lossless extension to the lossy coded image may be required. For example, consider the case of a reconstructed video frame in a video decoder, as illustrated in FIG. 12, wherein information from an image signal processor (ISP) 1200, e.g. a camera, is provided to a video processor (VPU) 1202 and ultimately to a display processor (DPU) 1204. The VPU 1202 and DPU 1204 can generally benefit from a lossy and fixed bandwidth format for this frame. However, the video decoder may need to use the frame as a reference picture for future decoding. In this case a lossless (but compressed) version of the frame is required.

Thus, according to embodiments of the technology described herein, an additional "lossless compensation" layer can be used that allows the lossy coding to be resolved into a lossless coding. For example, the lossless compensation layer provides the bit-plane coded values that did not fit into the fixed sized lossy output packet, to ensure the entropy coding is lossless. The lossless compensation layer can thus be generated alongside the fixed size data packet, and the lossless compensation layer and the fixed size data packet together contain all of the information required to reproduce the original input data without loss. Thus, where lossy coding is acceptable (and desired), the fixed size data packet may be provided (alone). However, where a lossless coding is required, the fixed size data packet can be provided together with the lossless compensation layer.

However, for the entire coding to be lossless, it is also required that the frequency transform operation is lossless. A lossless transform could be constructed out of a series of "lifting" stages that multiply by triangular 2×2 matrices with units on the diagonal. However, this iterative approach may be associated with relatively high latency and would introduce multiple stages of rounding error when used for lossy coding. It is desirable to have a transform that can be used efficiently for lossy and lossless coding.

Figure 13:
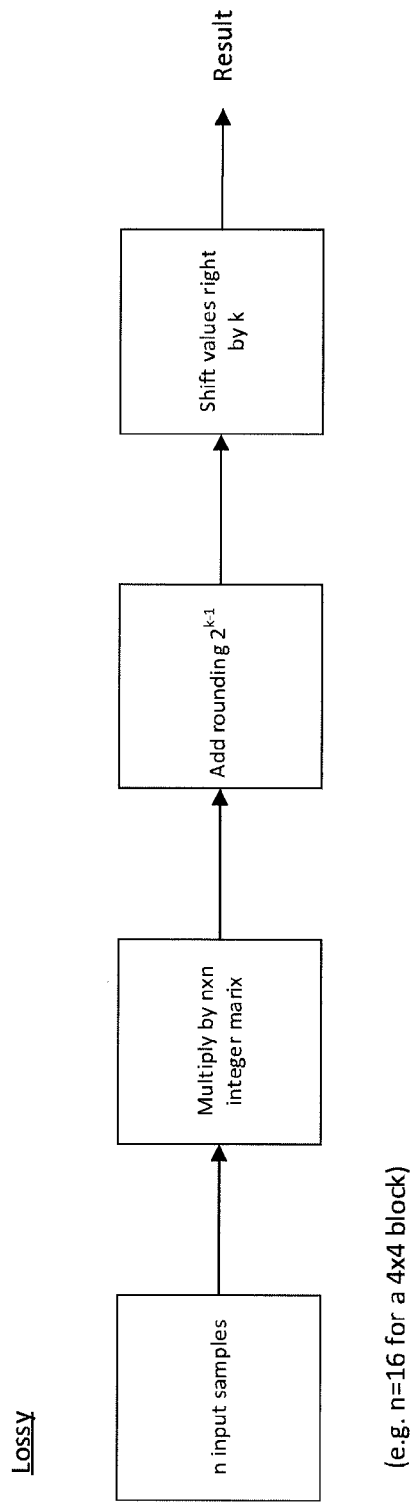
FIG. 13 shows an example of a lossy transform.

Lossy transforms are typically implemented as an integer matrix multiplication followed by a rounded right shift, e.g. as shown in FIG. 13. For example, a four-point DCT can be approximated as the following matrix followed by a rounded right shift of 5:

$$C = \begin{pmatrix} 16 & 16 & 16 & 16 \\ 20 & 9 & -9 & -20 \\ 16 & -16 & -16 & 16 \\ 8 & -22 & 22 & -8 \end{pmatrix}$$

Even though the matrix C/32 has determinant 1 and so maps regions to a region of same volume, it is not invertible due to the errors introduced by the rounding stage.

Accordingly, in embodiments, a biased rounding scheme may be used to ensure that the transform is lossless. For example, rather than rounding to nearest, the rounding operation may round to a value that may not always be the nearest but does generate an invertible map such that each input to the transform maps to a unique output. An example of this lossless transform is shown in FIG. 14.

The rounding is based on the values of the bits discarded by the shift operation. For instance, after the integer matrix multiplication, the MSB values may be rounded to the nearest value. However, for the LSB values, a biased rounding table may be used to ensure that there is a one to one correspondence. Since the LSB bits are in general available earlier than the MSB bits, this approach can be implemented efficiently, e.g. in terms of hardware timing.

For instance, given a transform $T(x)=(C.x)/n$ with a determinant $\pm 1$ (so that the transform preserves volume), wherein C is a k×k integer matrix, x is a vector of k integers and n is an integer divisor (typically a power of 2), it is desired to find a function $F(x)$ that approximates the transform $T(x)$ to give integer value outputs (i.e. by performing a suitable rounding operation) and that is also fully invertible.

This can be done as follows:
1) Define $C'=C \mod n$. $C'$ thus has a finite range, e.g. containing R elements: $C'(u_1), \ldots, (u_R)$;
2) Write the inverse of T as D/m, wherein D is an integral matrix and m is an integer;
3) Finding the smallest rounding vectors $r_1, \ldots, r_R$ such that:
    a. $C(u_i)+r_i$ is a multiple of n for each value of i; and
    b. $D(v_i) \mod m$ is different for each value of i, wherein $v_i=(C_i+r_i)/n$.
4) Then, to implement the forward function $F(x)$, the following steps can be performed given an input x:
    a. Compute the integer matrix multiple C.x;
    b. Set i such that $C.x \mod n=C'(u_i)$; (if n is a power of 2 this involves looking at the bottom $\log_2(n)$ bits of C.x); and
    c. Set the output $F(x)=(C.x+r_i)/n$.
5) To the implement the corresponding inverse function $G(y)$, the following steps can be performed given an input y:
    a. Compute the integer matrix multiply D.y;
    b. Set i so that $D.y \mod m=D(v_i) \mod m$; (if m is a power of 2 this involves looking at the bottom $\log_2(m)$ bits of D.y); and
    c. Set the output $G(y)=(D.y+s_i)/m$, where $s_i=m.u_i-D.v_i$, which can be precalculated ahead of time.

The code below gives an example implementation in C:

```
void f(int *y, int *x)
{
    const unsigned int round[8] = {
    0x08a08820, 0xfbffabaf,
    0xffff2000, 0xbbfa1100,
    0x00000000, 0xffffffff,
    0x39c41bc6, 0x788738c6
    };
    int u0 = x[0]+x[3];
    int u1 = x[0]-x[3];
    int u2 = x[1]+x[2];
    int u3 = x[1]-x[2];
    int v0 = u0+u2;
    int v1 = 20*u1 + 9*u3;
    int v2 = u0-u2;
    int v3 = 8*u1 - 22*u3;
    unsigned int p = v1 & 31; // 5 bits of phi
    if (v0 & 1)  // 1 bit of phi
    {
        y[0] = (v0>>1) + ((round[1]>>p)&1);
        y[1] = (v1>>5) + ((round[3]>>p)&1);
        y[2] = (v2>>1) + ((round[5]>>p)&1);
        y[3] = (v3>>5) + ((round[7]>>p)&1);
    }
    else
    {
        y[0] = (v0>>1) + ((round[0]>>p)&1);
        y[1] = (v1>>5) + ((round[2]>>p)&1);
        y[2] = (v2>>1) + ((round[4]>>p)&1);
        y[3] = (v3>>5) + ((round[6]>>p)&1);
    }
}
void f_inv(int *x, int *y)
{
    const unsigned int round[8] = {
    0xed082000, 0xed080000,
```

-continued

```
    0x20006002, 0xef6f6ee7,
    0xeceeacec, 0x19098108,
    0x0000096c, 0x0001256e
    };
    int v0 = src[0*src__stride];
    int v1 = src[1*src__stride];
    int v2 = src[2*src__stride];
    int v3 = src[3*src__stride];
    int u0 = y[0] + y[2];
    int u1 = 22*y[1] + 9*y[3];
    int u2 = y[0] − y[2];
    int u3 = 8*y[1] − 20*y[3];
    int x0 = (u0<<4) + u1;
    int x1 = (u2<<4) + u3;
    int x2 = (u2<<4) − u3;
    int x3 = (u0<<4) − u1;
    unsigned int p = x0 & 31;
    if (x1 & 16)
    {
        x[0] = (x0>>5) + ((round[1]>>p)&1);
        x[1] = (x1>>5) + ((round[3]>>p)&1);
        x[2] = (x2>>5) + ((round[5]>>p)&1);
        x[3] = (x3>>5) + ((round[7]>>p)&1);
    }
    else
    {
        x[0] = (x0>>5) + ((round[0]>>p)&1);
        x[1] = (x1>>5) + ((round[2]>>p)&1);
        x[2] = (x2>>5) + ((round[4]>>p)&1);
        x[3] = (x3>>5) + ((round[6]>>p)&1);
    }
}
```

The foregoing detailed description has been presented for the purposes of illustration and description. It is not intended to be exhaustive or to limit the technology described herein to the precise form disclosed. Many modifications and variations are possible in the light of the above teaching. The described embodiments were chosen in order to best explain the principles of the technology described herein and its practical applications, to thereby enable others skilled in the art to best utilise the technology described herein, in various embodiments and with various modifications as are suited to the particular use contemplated. It is intended that the scope be defined by the claims appended hereto.

The invention claimed is:

1. A method of encoding an array of data elements representing a spatial distribution of values, the method comprising:
   performing a frequency transform operation on the array of data elements to generate a corresponding set of frequency domain coefficients;
   representing the set of frequency domain coefficients as a plurality of bit plane arrays, each bit plane array representing a particular bit position of the frequency domain coefficient values, wherein each bit plane array comprises an array of bits corresponding to the bit values of each of the frequency domain coefficients at the bit position that the bit plane array represents; and
   encoding the set of frequency domain coefficients as a data packet having a fixed size by encoding the bit plane arrays in a bit plane sequence working from the bit plane array representing the most significant bit downwards until the data packet is full,
   wherein each bit plane array is encoded by:
   (i) subdividing the respective bit plane array being encoded into respective sections and, subject to there being available space in the data packet, including in the data packet data indicating the locations of any sections in that bit plane array that for the first time in the bit plane sequence contain one or more coefficient(s) having a non-zero bit value, and then
   ii) recursively subdividing into respective subsections any such newly active sections in the respective bit plane array being encoded and recursively subdividing into respective subsections any respective sections for which the first non-zero bit value appeared in a previous bit plane array in the bit plane sequence, and including in the data packet data indicating the locations of any subsections for which the first non-zero bit value in the bit plane sequence appears in the bit plane array until the location(s) of the coefficient(s) for which the first non-zero bit value appears in the bit plane array are indicated; and
   wherein the encoding for each bit plane array further comprises, so long as there is available space in the data packet, including in the data packet data indicating the raw bit values for any coefficient(s) for which the first non-zero bit value appeared in a previous bit plane array in the bit plane sequence.

2. The method of claim 1, wherein the encoding for each bit plane array further comprises, so long as there is available space in the data packet, including in the data packet after the data indicating the location of a coefficient for which the first non-zero bit value appears in the bit plane array data indicating the sign of the coefficient.

3. The method of claim 1, wherein the data indicating the bit values for any coefficient(s) for which the first non-zero bit value appeared in a previous bit plane array in the bit plane sequence is included in the data packet after the position(s) of all of the newly active coefficient(s) in that bit plane have been indicated.

4. The method of claim 1, comprising, when the data packet is full, generating a lossless compensation layer that includes information indicating the bit values and locations for any coefficient(s) for which data was not included into the fixed size data packet so that the lossless compensation layer together with the fixed size data packet contain all of the information required to reproduce the original input data array without loss.

5. The method of claim 1, wherein the frequency transform operation is configured to transform each data element to a unique frequency domain coefficient output such that the frequency transform operation is reversible by using a rounding operation dependent on values being rounded by the rounding operation for the frequency transform such that inputs to the frequency transform map to unique outputs.

6. The method of claim 1, wherein the encoding for each bit plane array further comprises, so long as there is available space in the data packet, including in the data packet:
   (i) data indicating the sign of the coefficient after the data indicating the location of a coefficient for which the first non-zero bit value appears in the bit plane array; and
   wherein the encoding for each bit plane array further comprises
   when the data packet is full, generating a lossless compensation layer separate to the fixed size data packet that includes information indicating the raw bit values and locations for any coefficient(s) for which data was not included into the fixed size data packet, as there was no available space in the data packet, so that the lossless compensation layer together with the fixed size data packet contain all of the information required to reproduce the original input data array without loss.

7. A non-transitory computer readable medium having executable instructions stored thereon that when executing on a data processor performs the method of claim 1.

8. A method for decoding a data stream, the data stream comprising a fixed size data packet that encodes a set of frequency domain coefficients as a sequence of bit plane arrays, each bit plane array in the bit plane sequence representing a particular bit position of the frequency domain coefficient values, wherein each bit plane array comprises an array of bits corresponding to the bit values of each of the frequency domain coefficients at the bit position that the bit plane array represents, and wherein each bit plane array is encoded by:
- (i) subdividing the respective bit plane array being encoded into respective sections and, subject to there being available space in the data packet, including in the data packet data indicating the locations of any sections in that bit plane array that for the first time in the bit plane sequence contain one or more coefficient(s) having a non-zero bit value, and then
- (ii) recursively subdividing into respective subsections any such newly active sections in the respective bit plane array being encoded and recursively subdividing into respective subsections as any respective sections for which the first non-zero bit value appeared in a previous bit plane array in the bit plane sequence, and including in the data packet data indicating the locations of any subsections for which the first non-zero bit value in the bit plane sequence appears in the bit plane array until the location(s) of the coefficient(s) for which the first non-zero bit value appears in the bit plane array are indicated, and wherein the encoding for each bit plane array further comprises, so long as there is available space in the data packet, including in the data packet data indicating the raw bit values for any coefficient(s) for which the first non-zero bit value appeared in a previous bit plane array in the bit plane sequence, such that the fixed size data packet includes data indicating, for each bit plane array in the bit plane sequence encoded in the fixed size data packet, the location(s) of any sections in that bit plane array that for the first time in the bit plane sequence contain one or more coefficient(s) having a non-zero bit value, as well as data indicating the location(s) within the bit plane array of any subsections of any such newly active sections in the bit plane array and also any subsections of any sections for which the first non-zero bit value appeared in a previous bit plane array in the bit plane sequence for which subsections the first non-zero bit value in the bit plane sequence appears in the bit plane array, and so on, until the location(s) of the frequency domain coefficient(s) for which the first non-zero bit value appears in the bit plane array are indicated, the method comprising:
determining from the fixed size data packet the location(s) for each bit plane array in the bit plane sequence encoded in the fixed size data packet of the frequency domain coefficients for which a non-zero bit value first appears in that bit plane array;

generating using the identified location(s) of the frequency domain coefficients for each bit plane array a plurality of bit plane arrays, each bit plane array in the bit plane sequence representing a particular bit position of the frequency domain coefficient values, wherein each bit plane array comprises an array of bits corresponding to the bit values of each of the frequency domain coefficients at the bit position that the bit plane array represents;

combining the generated bit plane arrays to generate a set of frequency domain coefficients; and using the set of frequency domain coefficients to obtain a decoded output.

9. The method of claim 8, wherein for any bit values in a given bit plane array that are not included in the fixed size data packet, but for which the sign is known, including a zero at that position in the bit plane array, and including a one at the corresponding position in the next bit plane down in the bit plane sequence.

10. The method of claim 8, wherein for any bit values in a given bit plane that are not included in the fixed size data packet, and for which the sign is not known, including a zero at that position in that bit plane.

11. An apparatus for encoding an array of data elements representing a spatial distribution of values, the apparatus comprising an encoder comprising:
- a transforming circuit for performing a frequency transform operation on the array of data elements to generate a corresponding set of frequency domain coefficients;
- a bit plane coding circuit for representing the set of frequency domain coefficients as a plurality of bit plane arrays, each bit plane array representing a particular bit position of the frequency domain coefficient values, wherein each bit plane array comprises an array of bits corresponding to the bit values of each of the frequency domain coefficients at the bit position that the bit plane array represents; and
- an encoding circuit that is configured to encode a set of bit plane array represented frequency domain coefficients as a data packet having a fixed size by encoding the bit plane arrays in a bit plane sequence working from bit plane array representing the most significant bit downwards until the data packet is full, wherein the encoding circuit is configured to encode each bit plane array by:
- (i) subdividing the respective bit plane array being encoded into respective sections and, subject to there being available space in the data packet, including in the data packet data indicating the locations of any sections in that bit plane array that for the first time in the bit plane sequence contain one or more coefficient(s) having a non-zero bit value, and then
- (ii) recursively subdividing into respective subsections any such newly active sections in the respective bit plane array being encoded and recursively subdividing into respective subsections any respective sections for which the first non-zero bit value appeared in a previous bit plane array in the bit plane sequence, and including in the data packet data indicating the locations of any subsections for which the first non-zero bit value in the bit plane sequence appears in the bit plane array until the location(s) of the coefficient(s) for which the first non-zero bit value appears in the bit plane array are indicated; and wherein the encoding for each bit plane array further comprises, so long as there is available space in the data packet, including in the data packet data indicating the raw bit values for any coefficient(s) for which the first non-zero bit value appeared in a previous bit plane array in the bit plane sequence.

12. The apparatus of claim 11, wherein the encoding for each bit plane array further comprises, so long as there is available space in the data packet, including in the data packet after the data indicating the location of a coefficient for which the first non-zero bit value appears in the bit plane array data indicating the sign of the coefficient.

13. The apparatus of claim 11, wherein the data indicating the bit values for any coefficient(s) for which the first non-zero bit value appeared in a previous bit plane array in the bit plane sequence is included in the data packet after the position(s) of all of the newly active coefficient(s) in that bit plane have been indicated.

14. The apparatus of claim 11, wherein the encoding circuit is configured to, when the data packet is full, generate a lossless compensation layer that includes information indicating the bit values and locations for any bits for which data was not included into the fixed size data packet so that the lossless compensation layer together with the fixed size data packet contain all of the information required to reproduce the original input data array without loss.

15. The apparatus of claim 11, wherein the frequency transform operation is configured to transform each data element to a unique frequency domain coefficient output such that the frequency transform operation is reversible by using a rounding operation dependent on values being rounded by the rounding operation for the frequency transform such that inputs to the frequency transform map to unique outputs.

16. The apparatus of claim 11, wherein the encoding for each bit plane array further comprises, so long as there is available space in the data packet, including in the data packet:
(i) data indicating the sign of the coefficient after the data indicating the location of a coefficient for which the first non-zero bit value appears in the bit plane array; and
wherein the encoding circuit is configured to, when the data packet is full, generate a lossless compensation layer separate to the data packet that includes information indicating the raw bit values and locations for any coefficient(s) for which data was not included into the fixed size data packet, as the fixed size data packet has no available space, so that the lossless compensation layer together with the fixed size data packet contain all of the information required to reproduce the original input data array without loss.

\* \* \* \* \*